US010411589B2

(12) United States Patent
Nakashima et al.

(10) Patent No.: US 10,411,589 B2
(45) Date of Patent: Sep. 10, 2019

(54) POWER CONVERSION APPARATUS AND POWER SEMICONDUCTOR MODULE

(71) Applicant: Mitsubishi Electric Corporation, Chiyoda-ku, Tokyo (JP)

(72) Inventors: Yukio Nakashima, Tokyo (JP); Takayoshi Miki, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 15/526,924

(22) PCT Filed: Dec. 22, 2015

(86) PCT No.: PCT/JP2015/085881
§ 371 (c)(1),
(2) Date: May 15, 2017

(87) PCT Pub. No.: WO2016/104533
PCT Pub. Date: Jun. 30, 2016

(65) Prior Publication Data
US 2017/0338734 A1 Nov. 23, 2017

(30) Foreign Application Priority Data

Dec. 22, 2014 (JP) .................... PCT/JP2014/083929

(51) Int. Cl.
*H02M 1/34* (2007.01)
*H02M 7/00* (2006.01)
(Continued)

(52) U.S. Cl.
CPC ............ *H02M 1/34* (2013.01); *H02M 7/003* (2013.01); *H02M 7/217* (2013.01); *H02M 7/537* (2013.01); *H02P 27/06* (2013.01)

(58) Field of Classification Search
CPC .... H02M 5/4585; H02M 5/458; H02M 5/447; H02M 5/45; H02M 5/4505; H02M 5/005;
(Continued)

(56) References Cited

U.S. PATENT DOCUMENTS 8,217,533 B2 * 7/2012 Jones ........................ H02J 3/01
307/82
2004/0056661 A1 3/2004 Maeda et al.
(Continued)

FOREIGN PATENT DOCUMENTS

EP 0 616 416 A1 9/1994
JP S60-125177 A 7/1985
(Continued)

OTHER PUBLICATIONS

International Search Report (PCT/ISA/210) dated Apr. 5, 2016, by the Japanese Patent Office as the International Searching Authority for International Application No. PCT/JP2015/085881.
(Continued)

*Primary Examiner* — Jue Zhang
*Assistant Examiner* — Kevin H Sprenger
(74) *Attorney, Agent, or Firm* — Buchanan Ingersoll & Rooney PC

(57) ABSTRACT

A power conversion apparatus includes a main capacitor to store therein DC power, and an inverter circuit to convert the DC power stored in the main capacitor to AC power. The main capacitor and a power semiconductor element that constitutes the inverter circuit are connected to each other by a P-side common wire through which a switching current flows. A switching-current shunt component is connected in parallel to the P-side common wire.

5 Claims, 27 Drawing Sheets

(51) Int. Cl.
  *H02M 7/217* (2006.01)
  *H02M 7/537* (2006.01)
  *H02P 27/06* (2006.01)
(58) Field of Classification Search
  CPC ............ H02M 1/12; H02M 1/32; H02M 1/38;
         H02M 1/34; H02M 7/7575; H02M 7/48;
         H02M 7/51; H02M 7/538; H02M 7/5387;
           H02M 7/003; H02M 7/53871; H02M
           7/53875; H02M 7/53803; H02M 7/537;
           H02M 7/5395; H02M 3/3376; H02M
           3/335; H02M 3/33569; H02M 3/33523;
              Y02B 70/126; Y02B 70/1491; Y02B
              70/1441; H02J 9/063; H02J 9/062; H02J
              3/36; H02J 3/382; H02H 7/127; H02H
              7/268; H02H 7/1209; H02H 7/122; H02H
              7/1227; H03K 2217/0036; H03K 17/18;
                                              H03K 17/61
  USPC ... 363/34–37, 51, 55–56.05, 56.12, 131–132
  See application file for complete search history.

(56) References Cited

U.S. PATENT DOCUMENTS

| | | | | |
|---|---|---|---|---|
| 2009/0058334 | A1* | 3/2009 | Yamamoto | H02P 21/24 318/400.02 |
| 2013/0234446 | A1* | 9/2013 | Kishibata | G05B 19/00 290/38 R |
| 2013/0264974 | A1* | 10/2013 | Suzuki | H02P 27/08 318/139 |
| 2014/0334203 | A1 | 11/2014 | Honda et al. | |
| 2015/0075898 | A1* | 3/2015 | Suzuki | B62D 5/0472 180/443 |

FOREIGN PATENT DOCUMENTS

| | | |
|---|---|---|
| JP | 10-290572 A | 10/1998 |
| JP | 2000-134908 A | 5/2000 |
| JP | 2006-196721 A | 7/2006 |
| JP | 2007-166708 A | 6/2007 |
| JP | 2008-301546 A | 12/2008 |
| JP | 4297995 | 7/2009 |
| JP | 2010-028983 A | 2/2010 |
| JP | 2010-136505 A | 6/2010 |
| JP | 2011-36020 A | 2/2011 |
| WO | WO 03/032478 A1 | 4/2003 |

OTHER PUBLICATIONS

Written Opinion (PCT/ISA/237) dated Apr. 5, 2016, by the Japanese Patent Office as the International Searching Authority for International Application No. PCT/JP2015/085881.

International Search Report (PCT/ISA/210) dated Mar. 31, 2015, by the Japanese Patent Office as the International Searching Authority for International Application No. PCT/JP2014/083929.

Office Action (Notice of Rejection) dated Jul. 4, 2017, by the Japanese Patent Office in corresponding Japanese Patent Application No. 2016-566406, and an English Translation of the Office Action. (4 pages).

Office Action (The First Office Action) dated Oct. 31, 2018, by the State Intellectual Property Office of People's Republic of China in corresponding Chinese Paten Application No. 201580067936.9, and an English translation of the Office Action. (20 pages).

Examination Report dated May 27, 2019, by the Indian Patent Office in corresponding Indian Patent Application No. 201747019589, with English translation. (6 pages).

* cited by examiner

POWER CONVERSION APPARATUS AND POWER SEMICONDUCTOR MODULE

FIELD

The present invention relates to a power conversion apparatus that performs power conversion and a power semiconductor module.

BACKGROUND

Power conversion apparatuses such as an in-vehicle inverter for a railway vehicle, and an in-vehicle DC-DC converter for an electric car, which perform power conversion by a switching operation of a power semiconductor element, have become widespread. The power semiconductor element is sealed with resin, and constitutes a power semiconductor module. The power semiconductor module is used in the power conversion apparatus.

Upon a switching operation of the power semiconductor element, switching current flows through the wires inside the power conversion apparatus. The switching operation of the power semiconductor element refers to switching of a power semiconductor element between a low-resistance on-state and a high-resistance off-state at short intervals of several nanoseconds to several tens of microseconds. The switching current refers to a current that flows through the power semiconductor element when the power semiconductor element is performing the switching operation, and whose value varies by several tens of amperes to tens of thousands of amperes within a time as short as several nanoseconds to several tens of microseconds.

Due to the presence of a parasitic inductance in a wire inside the power conversion apparatus, a voltage is generated in the wire when a switching current flows through the wire in accordance with the law of electromagnetism. This voltage is often referred to as "surge voltage". As the time rate of change of the switching current is greater and the parasitic inductance in the wire is greater, a higher surge voltage is generated in the wire. The surge voltage generated in the wire is applied to a component inside the power conversion apparatus. When a higher surge voltage is generated in the wire, the excessive surge voltage is applied to the component inside the power conversion apparatus and may result in breakage of the component.

To address that problem, conventional measures have been taken to connect a snubber to a component inside the power conversion apparatus in order to reduce the surge voltage applied to the component. For example, Patent Literature 1 listed below has disclosed a conventional technique to connect a snubber constituted by a diode, a capacitor, and an inductor, to a power semiconductor element in order to reduce the surge voltage applied to the power semiconductor element.

CITATION LIST

Patent Literature

Patent Literature 1: Japanese Patent No. 4297995

SUMMARY

Technical Problem

There are various types of components inside the power conversion apparatus. A DC voltage is applied to one of these components for a long time when the power conversion apparatus is in an operating state. When a snubber is attached to the component described above, a surge voltage applied to this component can be reliably reduced. However, A DC voltage is also applied to the snubber for a long time. In general, the longer the time during which a DC voltage is applied to a component, the less the electrical insulating performance of the component becomes. The snubber thus needs to be constituted by high voltage-resistant components. A problem with the high voltage-resistant components is that these high voltage-resistant components are large in size, and thus hinder downsizing of the power conversion apparatus.

The present invention has been achieved taking the foregoing into consideration, and an object of the present invention is to provide a power conversion apparatus including a snubber that is constituted by only low voltage-resistant components as well as reducing a surge voltage applied to a component inside the power conversion apparatus.

Solution to Problem

To solve the above-mentioned problem and achieve the object, the present invention provides a power conversion apparatus including a power semiconductor element to perform a switching operation, wherein a switching-current shunt component is connected in parallel to a wire through which a switching current flows.

Advantageous Effects of Invention

According to the present invention, a portion of the switching current is shunted to, and flows through, the switching-current shunt component. This reduces the switching current that flows through the wire, and thus reduces the surge voltage generated in the wire. Accordingly, the surge voltage applied to a component inside the power conversion apparatus can be reduced. In addition, since a DC voltage is not applied to the switching-current shunt component for a long time, the effect that the switching-current shunt component can be constituted by only low voltage-resistant components can be obtained.

DESCRIPTION OF EMBODIMENTS

Exemplary embodiments of a power conversion apparatus according to the present invention will be explained below with reference to the drawings. The present invention is not limited to the embodiments. In the following descriptions, "connect" refers not only to a physical connecting relation, but also to an electrical connecting relation.

First Embodiment

Figure 1:
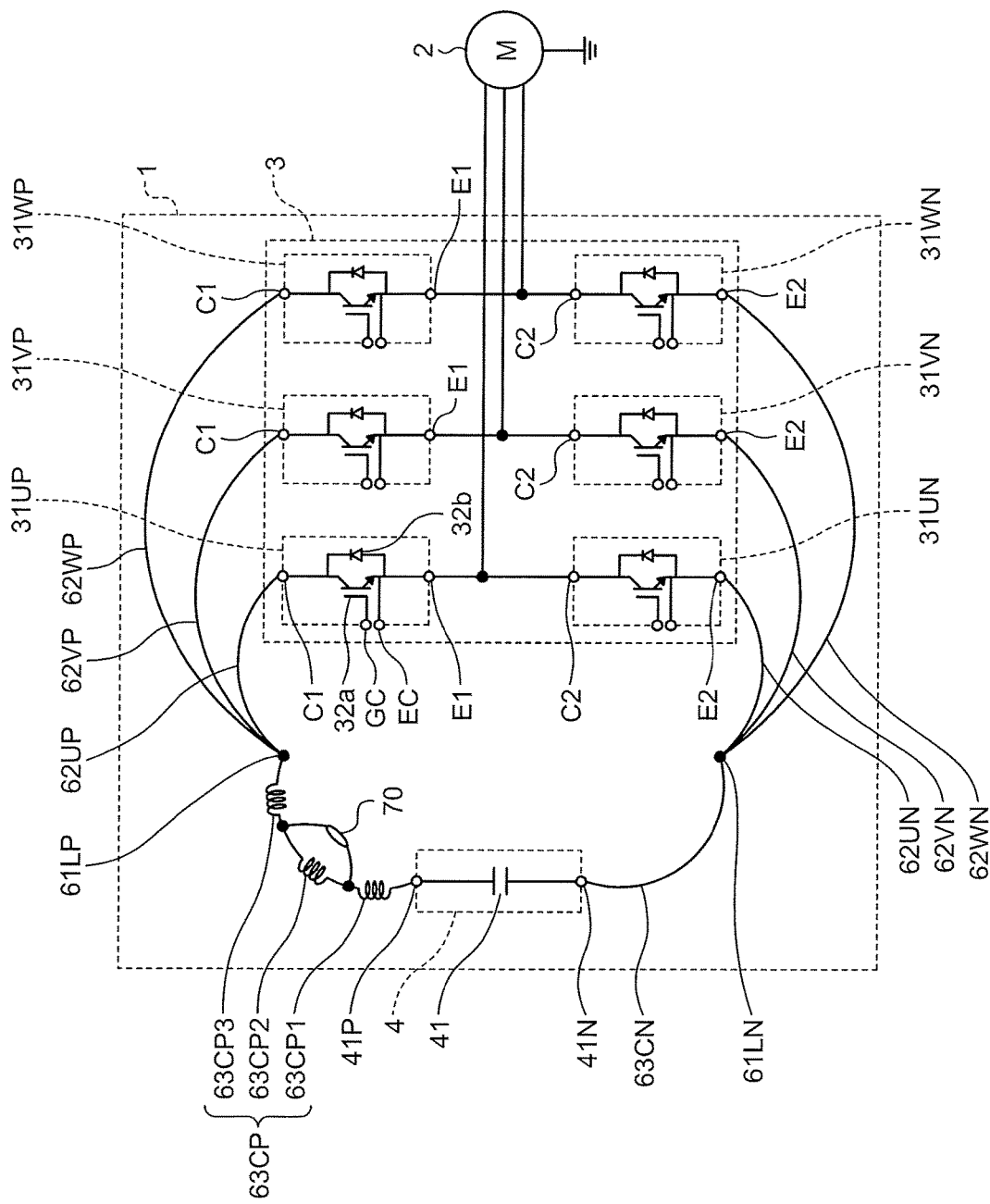
FIG. 1 is a diagram illustrating an example of a circuit configuration of a power conversion apparatus according to a first embodiment.

FIG. 1 is a diagram illustrating an example of a circuit configuration of a power conversion apparatus according to a first embodiment. A power conversion apparatus 1 includes an inverter circuit 3 (also referred to as "power conversion circuit") and a main capacitor 4. An electric motor 2 as a load is connected to the power conversion apparatus 1. The inverter circuit 3 constitutes a two-level three-phase inverter circuit, and converts DC power stored in the main capacitor 4 to AC power (three-phase AC power in FIG. 1) to supply the AC power to the electric motor 2 that is a load.

The main capacitor 4 includes one or a plurality of capacitor elements 41. The capacitor elements 41 are sealed with resin for the purpose of ensuring insulation properties and a mechanical strength. The capacitor elements 41 constitute the main capacitor 4. The main capacitor 4 includes terminals for electrically connecting to external circuits. More specifically, the main capacitor includes a main-capacitor P-terminal 41P that is a positive-side terminal of the main capacitor 4, and a main-capacitor N-terminal 41N that is a negative-side terminal of the main capacitor 4. The main-capacitor P-terminal 41P and the main-capacitor N-terminal 41N are electrically connected to the capacitor elements 41 through wires within the main capacitor 4. The main capacitor 4 has DC power stored therein. Therefore, when the power conversion apparatus 1 is in an operating state, a DC voltage is applied to the main capacitor 4 for a long time.

In the first embodiment, an insulated gate bipolar transistor (IGBT) is used as a power semiconductor element. A power semiconductor element, and a diode that is connected in inverse parallel to the power semiconductor element, are sealed with resin for the purpose of ensuring insulation properties and a mechanical strength. The power semiconductor element and the diode constitute a power semiconductor module. In FIG. 1, for example, on the higher-potential side (also referred to as "positive side") of the U-phase (hereinafter, "P-side U-phase"), a power semiconductor element 32a (positive-side switching element) and a diode 32b are sealed to constitute a P-side U-phase power semiconductor module 31UP. To electrically connect to an external circuit, the P-side U-phase power semiconductor module 31UP includes a collector terminal C1 that is a first terminal, an emitter terminal E1 that is a second terminal, a gate control terminal GC that is a first control terminal, and an emitter control terminal EC that is a second control terminal. The collector terminal C1, the emitter terminal E1, the gate control terminal GC, and the emitter control terminal EC are electrically connected to the power semiconductor element 32a and the diode 32b through internal wires. In the present embodiment, the collector terminal C1 constitutes a positive-side terminal of the inverter circuit 3 that is the power conversion circuit, and the emitter terminal E1 constitutes an AC terminal of the inverter circuit 3.

On the lower-potential side (also referred to as "negative side") of the U-phase (hereinafter, "N-side U-phase"), an N-side U-phase power semiconductor module 31UN in which a power semiconductor element (a negative-side switching element) and a diode are sealed is provided. The P-side U-phase power semiconductor module 31UP and the N-side U-phase power semiconductor module 31UN constitute a U-phase arm circuit. The emitter terminal E1 of the P-side U-phase power semiconductor module 31UP, and a collector terminal C2 of the N-side U-phase power semiconductor module 31UN are electrically connected to each other. Their connection point connects to the electric motor 2 that is the load. The collector terminal C1 of the P-side U-phase power semiconductor module 31UP is electrically connected to the main-capacitor P-terminal 41P of the main capacitor 4. An emitter terminal E2 of the N-side U-phase power semiconductor module 31UN is electrically connected to the main-capacitor N-terminal 41N of the main capacitor 4. The V-phase and W-phase arm circuits are configured in the same manner as the U-phase arm circuit. Therefore, the redundant descriptions thereof are omitted. In the present embodiment, the emitter terminal E2 constitutes a negative-side terminal of the inverter circuit 3 that is the power conversion circuit, and the collector terminal C2 constitutes an AC terminal of the inverter circuit 3.

A connection between the main capacitor 4 and each power semiconductor module is described below in detail. The main-capacitor P-terminal 41P and a P-side wire relay point 61LP are connected to each other by a P-side common wire 63CP. The P-side wire relay point 61LP, and the collector terminal C1 of the P-side U-phase power semiconductor module 31UP, are connected to each other by a P-side U-phase wire 62UP. The P-side wire relay point 61LP, and a collector terminal C1 of a P-side V-phase power semiconductor module 31VP, are connected to each other by a P-side V-phase wire 62VP. The P-side wire relay point 61LP, and a collector terminal C1 of a P-side W-phase power semiconductor module 31WP, are connected to each other by a P-side W-phase wire 62WP. Similarly, the main-capacitor N-terminal 41N, and an N-side wire relay point 61LN are connected to each other by an N-side common wire 63CN. The N-side wire relay point 61LN, and the emitter terminal E2 of the N-side U-phase power semiconductor module 31UN, are connected to each other by an N-side U-phase wire 62UN. The N-side wire relay point 61LN, and an emitter terminal E2 of an N-side V-phase power semiconductor module 31VN, are connected to each other by an N-side V-phase wire 62VN. The N-side wire relay point 61LN, and an emitter terminal E2 of an N-side W-phase power semiconductor module 31WN, are connected to each other by an N-side W-phase wire 62WN. In the present specification, the P-side common wire 63CP, the P-side U-phase wire 62UP, the P-side V-phase wire 62VP, and the P-side W-phase wire 62WP are collectively referred to as a positive-side connection wire member that connects the positive-side terminals of the inverter circuit 3 and the positive-side terminal (the P-terminal 41P) of the main capacitor 4. Similarly, the N-side common wire 63CN, the N-side U-phase wire 62UN, the N-side V-phase wire 62VN, the N-side W-phase wire 62WN are collectively referred to as a negative-side connection wire member that connect the negative-side terminals of the inverter circuit 3 and the negative-side terminal (the N terminal 41N) of the main capacitor 4.

The feature of the first embodiment is that a switching-current shunt component 70 is connected in parallel to the P-side common wire 63CP. The switching-current shunt component 70 is a two-terminal component. Therefore, there are two connection points between the switching-current shunt component 70 and the P-side common wire 63CP. A parasitic inductance in the P-side common wire 63CP can be regarded as been divided into three parasitic inductances by the connection points between the switching-current shunt component 70 and the P-side common wire 63CP. As illustrated in FIG. 1, these three parasitic inductances are represented as a wire parasitic inductance 63CP1, a wire parasitic inductance 63CP2, and a wire parasitic inductance 63CP3 in the direction from the main-capacitor P-terminal 41P toward the P-side wire relay point 61LP. For the connection configuration in FIG. 1, thus, the switching-current shunt component 70 can be regarded as being connected in parallel to the wire parasitic inductance 63CP2.

Upon a switching operation of the P-side power semiconductor element, a switching current flows through the P-side common wire 63CP. This switching current flows through the wire parasitic inductances 63CP1, 63CP2, and 63CP3. According to the law of electromagnetism, surge voltages are generated in the wire parasitic inductances 63CP1, 63CP2, and 63CP3. For the configuration of the first embodiment, a portion of the switching current is shunted to, and flows through, the switching-current shunt component 70, such that the switching current that flows through the wire parasitic inductance 63CP2 is reduced. This reduces a surge voltage generated in the wire parasitic inductance 63CP2. This results in a reduction in surge voltage applied to the power semiconductor element. In the manner as described above, the switching-current shunt component 70 functions as a snubber that reduces a surge voltage applied to a component inside the power conversion apparatus 1.

Meanwhile, when the power conversion apparatus 1 is in an operating state, a DC current can flow through the wires inside the power conversion apparatus 1 for a long time. In general, the wires inside the power conversion apparatus 1 are made of metal, and therefore have a minute DC resistance value. Accordingly, although a DC current flows through the wires, the DC voltage generated in the wires inside the power conversion apparatus 1 is so minute as to be negligible. Therefore, a so-called surge voltage is generated during a time period of the switching operation of the power semiconductor element of the power conversion apparatus 1 while a voltage drop generated in the P-side common wire 63CP is so minute as to be negligible during the other time periods even if a current flows through the wires in the power conversion apparatus 1. As a result, the voltage applied to the switching-current shunt component 70 connected in parallel to the P-side common wire 63CP does not become a large DC voltage like the voltage applied to the power semiconductor element, and thus the switching-current shunt component 70 can be constituted by low voltage-resistant components. That is, in the present embodiment, the switching-current shunt component 70, which is connected in parallel between two points on the P-side common wire 63CP having substantially the same potential, can be constituted by low voltage-resistant components. Even these two points can fail to have the same potential during the switching, due to generation of an electromotive force determined by a wire inductance between the two points and an amount of change in current accompanied by the switching. In the present specification, the phrase "between two points having substantially the same potential" means between two points having substantially the same potential in a steady state in which a switching element is not performing any switching operation. Although, in the present embodiment, the switching-current shunt component 70 is provided to be connected in parallel to the P-side common wire 63CP of the positive-side connection wire member, the switching-current shunt components 70 may be connected in parallel to the P-side U-phase wire 62UP, the P-side V-phase wire 62VP, and the P-side W-phase wire 62WP. Note that, the single component, which is connected in parallel to the P-side common wire 63CP, provides the effect of suppressing a surge voltage generated during the switching operations of all of the phases.

In the conventional technique, snubber components are attached to a power semiconductor element to reduce the surge voltage applied to the power semiconductor element. A high voltage, which is equivalent to a charging voltage of a main capacitor, is applied to such a power semiconductor element for a long time when the power conversion apparatus 1 is in an off state, such that an equivalent DC voltage is applied to the snubber of the conventional technique. The snubber of the conventional technique thus needs to be constituted by high voltage-resistant components.

When a power conversion apparatus is in an operating state, the DC voltage applied to a power semiconductor element varies significantly in both the conventional technique and the technique of the first embodiment. When the power semiconductor element is in an on state, a low DC voltage, which is normally lower than 10 volts, is applied to this power semiconductor element. When the power semiconductor element is in an off state, on the other hand, a high DC voltage, which is equivalent to the charging voltage of the main capacitor, is applied to this power semiconductor element.

For the conventional snubber, thus, the DC voltage to be applied to this conventional snubber also varies significantly, and this results in flow of a charging/discharging current through the snubber components, thereby posing a problem of power loss. For the snubber of the present invention such as the first embodiment, on the other hand, the DC voltage applied to the snubber does not vary significantly although the DC voltage applied to the power semiconductor element varies significantly. That is, a high charging/discharging current does not flow through the snubber components of the snubber of the present invention, which produces the effect of significantly suppressing the occurrence of a power loss.

Figure 2:
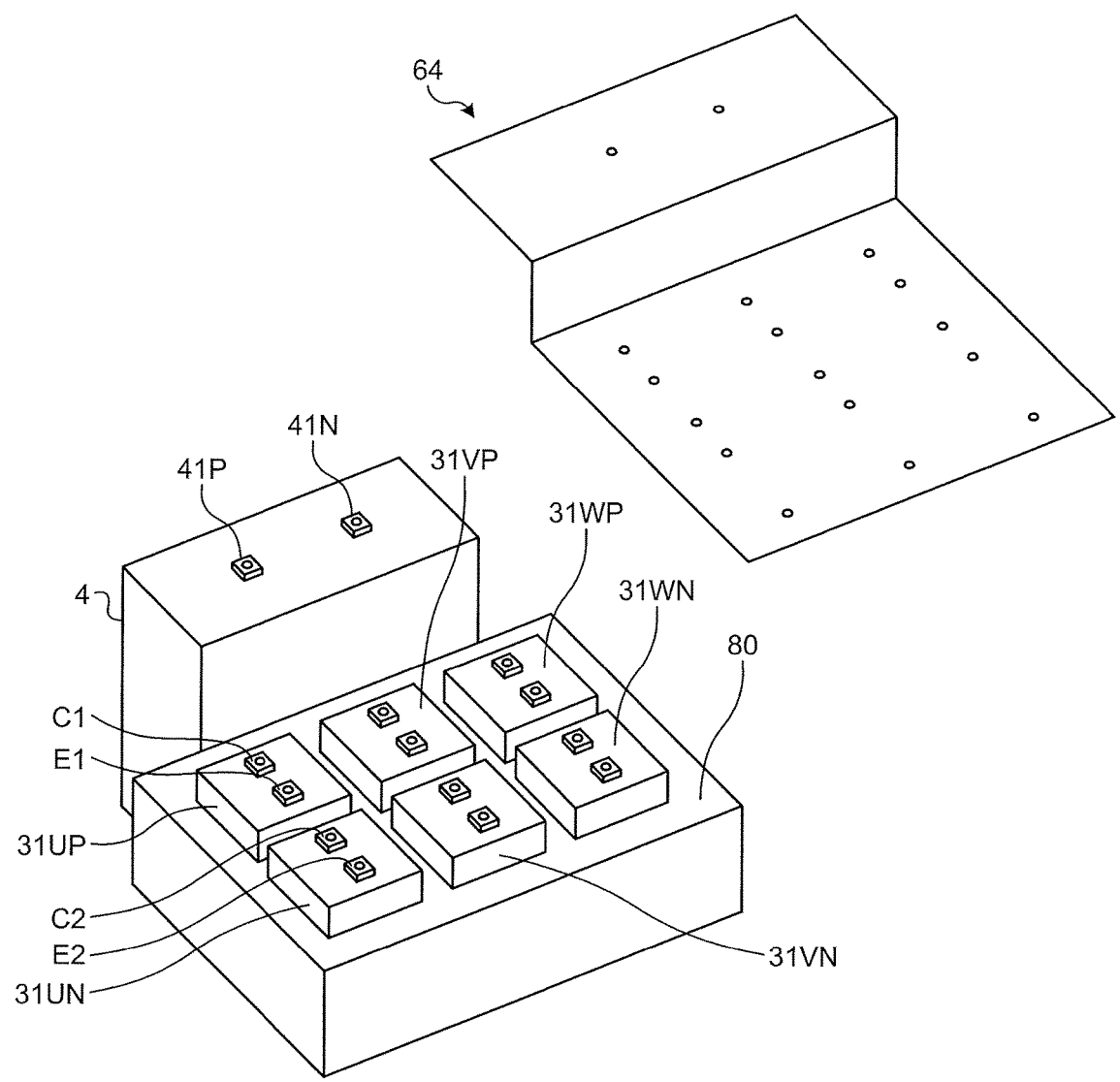
FIG. 2 is a perspective view illustrating a configuration example of a part of components in the power conversion apparatus according to the first embodiment.

Next, the structure of the power conversion apparatus 1 according to the first embodiment is described. FIG. 2 is a perspective view illustrating a configuration example of a part of the components in the power conversion apparatus according to the first embodiment. In the following descriptions, the P-side U-phase power semiconductor module 31UP, the P-side V-phase power semiconductor module 31VP, and the P-side W-phase power semiconductor module 31WP, all of which constitute a higher-potential arm, are collectively referred to as "P-side power semiconductor module", or "P-side arm" where appropriate. Further, the N-side U-phase power semiconductor module 31UN, the N-side V-phase power semiconductor module 31VN, and the N-side W-phase power semiconductor module 31WN, all of which constitute a lower-potential arm, are collectively referred to as "N-side power semiconductor module", or "N-side arm" where appropriate. Furthermore, the P-side power semiconductor module and the N-side power semiconductor module are simply referred to as "power semiconductor module" when the module is discussed without telling which one of the P-side module and the N-side module it is. Further, in the following descriptions, the collector terminal C1 and the emitter terminal E1 of the P-side power semiconductor module and the collector terminal C2 and the emitter terminal E2 of the N-side power semiconductor module are simply referred to as "collector terminal C" and "emitter terminal E" when the terminal is discussed without telling which one of the terminal of the P-side module and the terminal of the N-side module it is.

In FIG. 2, the P-side U-phase power semiconductor module 31UP, the P-side V-phase power semiconductor module 31VP, the P-side W-phase power semiconductor module 31WP, the N-side U-phase power semiconductor module 31UN, the N-side V-phase power semiconductor module 31VN, and the N-side W-phase power semiconductor module 31WN are installed on a cooler 80. The collector terminal C and the emitter terminal E are provided on the top surface of the power semiconductor module 31. When the power conversion apparatus 1 is in an operating state, the power semiconductor module 31 generates heat. The heat generated by the power semiconductor module 31 transfers from the bottom surface of the power semiconductor module 31 to the cooler 80. In this manner, the increase in temperature of the power semiconductor module 31 is suppressed. The main capacitor 4 has a cuboid shape. The main-capacitor P-terminal 41P, and the main-capacitor N-terminal 41N are provided on one side of the cuboid.

Each terminal (the main-capacitor P-terminal 41P and the main-capacitor N-terminal 41N) of the main capacitor 4 is electrically connected to each terminal (the collector terminals C1 and C2, and the emitter terminals E1 and E2) of the power semiconductor module 31 through a busbar 64. That is, the positive-side connection wire member and the negative-side connection wire member that connect the main capacitor 4 and the inverter circuit are constituted by the busbar 64. For example, the busbar 64 is a component made up of plural stacked layers of metal plate and insulating film. A high current flows through the busbar 64 for a long time. In general, the busbar 64 is formed to be wide enough to reduce the electric resistance, and is also formed to be thin enough to dissipate the heat generated in the busbar 64 to the outside air. It is desirable that the busbar 64 has a low parasitic inductance because a switching current flows through the busbar 64. However, it is difficult to reduce the parasitic inductance in the busbar 64. Based on the assumption of the common configuration, the reasons why it is difficult to reduce the parasitic inductance in the busbar 64 are described.

In general, a cooler on which power semiconductor modules are installed has a different shape from a shape of a main capacitor. In general, the spacing between terminals of the power semiconductor module is different from the spacing between terminals of the main capacitor. Further, the main capacitor and the cooler are heavy products, and therefore need to be surrounded by a metal frame to be rigidly fixed to each other. This makes it difficult for each terminal of the main capacitor to be electrically connected to each terminal of the power semiconductor module by a short distance through a busbar. As a result, each terminal of the main capacitor needs to be electrically connected to each terminal of the power semiconductor module by a long distance through the busbar. This cannot avoid the increase in parasitic inductance in the busbar. Therefore, a higher surge voltage is generated in the busbar.

Figure 3:
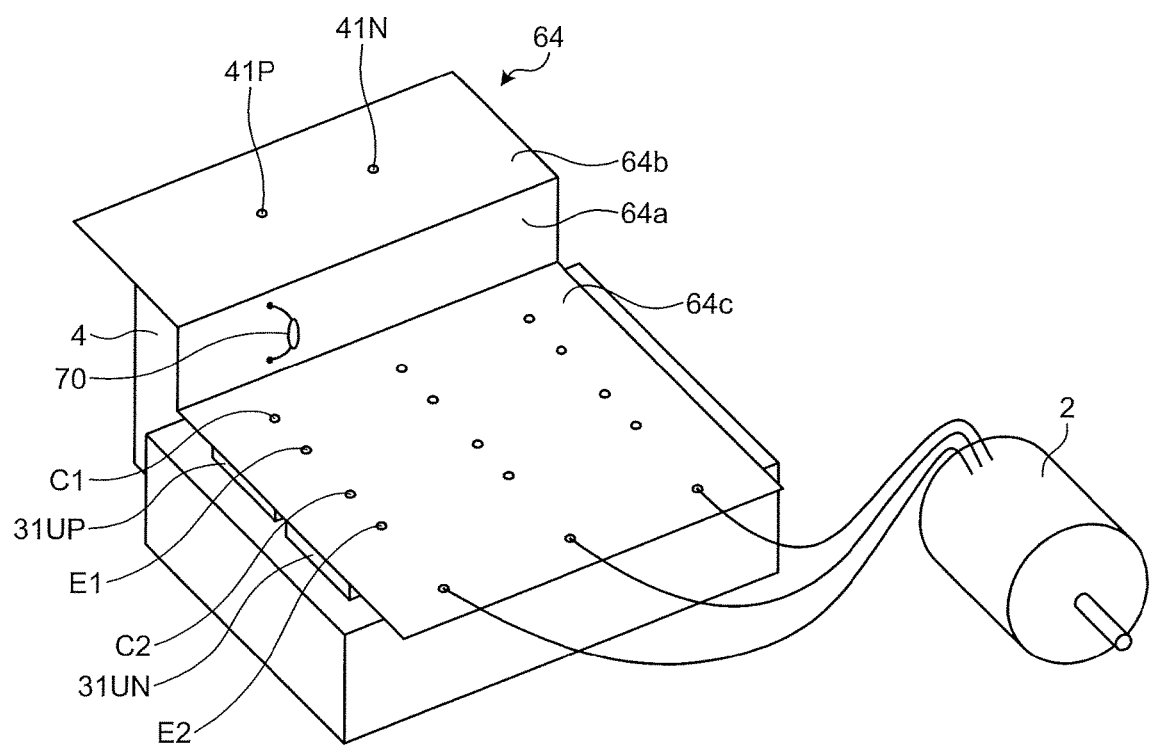
FIG. 3 is a perspective view illustrating a configuration example of the power conversion apparatus according to the first embodiment.

In the power conversion apparatus 1 according the first embodiment, the switching-current shunt component 70 is thus provided as described above. FIG. 3 is a perspective view illustrating a configuration example of the power conversion apparatus 1 according to the first embodiment.

As illustrated in FIG. 1, the feature of the first embodiment is that the switching-current shunt component 70 is connected to portions of the P-side common wire 63CP. The switching-current shunt component 70 is a two-terminal component, and therefore there are the two connection points between the switching-current shunt component 70 and the P-side common wire 63CP. Accordingly, as illustrated in FIG. 3, the switching-current shunt component 70 that is the two-terminal component is electrically connected to portions of the busbar 64 corresponding to the P-side common wire 63CP. This configuration allows a portion of the switching current to be shunted to, and flow through, the switching-current shunt component 70. This reduces the switching current that flows through the busbar 64. In the example in FIG. 3, the busbar 64 is formed into a crank shape, and the switching-current shunt component 70 is connected to a bent section 64a of the crank-shaped busbar 64. However, the connection configuration is not limited thereto. For example, one terminal of the switching-current shunt component 70 may be connected to a flat section 64b or a flat section 64c, which is perpendicular to the bent section 64a. One terminal of the switching-current shunt component 70 may be connected to the flat section 64b, while the other terminal of the switching-current shunt component 70 may be connected to the flat section 64c. Note that, because it is preferable to connect the switching-current shunt component 70 in parallel at a point having a high parasitic inductance, it is preferable to connect the switching-current shunt component 70 to bridge the bent section 64a. This configuration makes it possible to have a larger parasitic capacitance between the two connection points connected to the switching-current shunt component 70, and thus more effectively suppress a surge voltage, as compared to a case where the switching-current shunt component 70 is connected in parallel only on any of planar portion.

As described above, in the power conversion apparatus according to the first embodiment, the switching-current shunt component is configured to be connected in parallel to the wire through which the switching current flows. Therefore, a snubber that can reduce a surge voltage applied to a component inside the power conversion apparatus can be constituted by only low voltage-resistant components.

Second Embodiment

Figure 4:
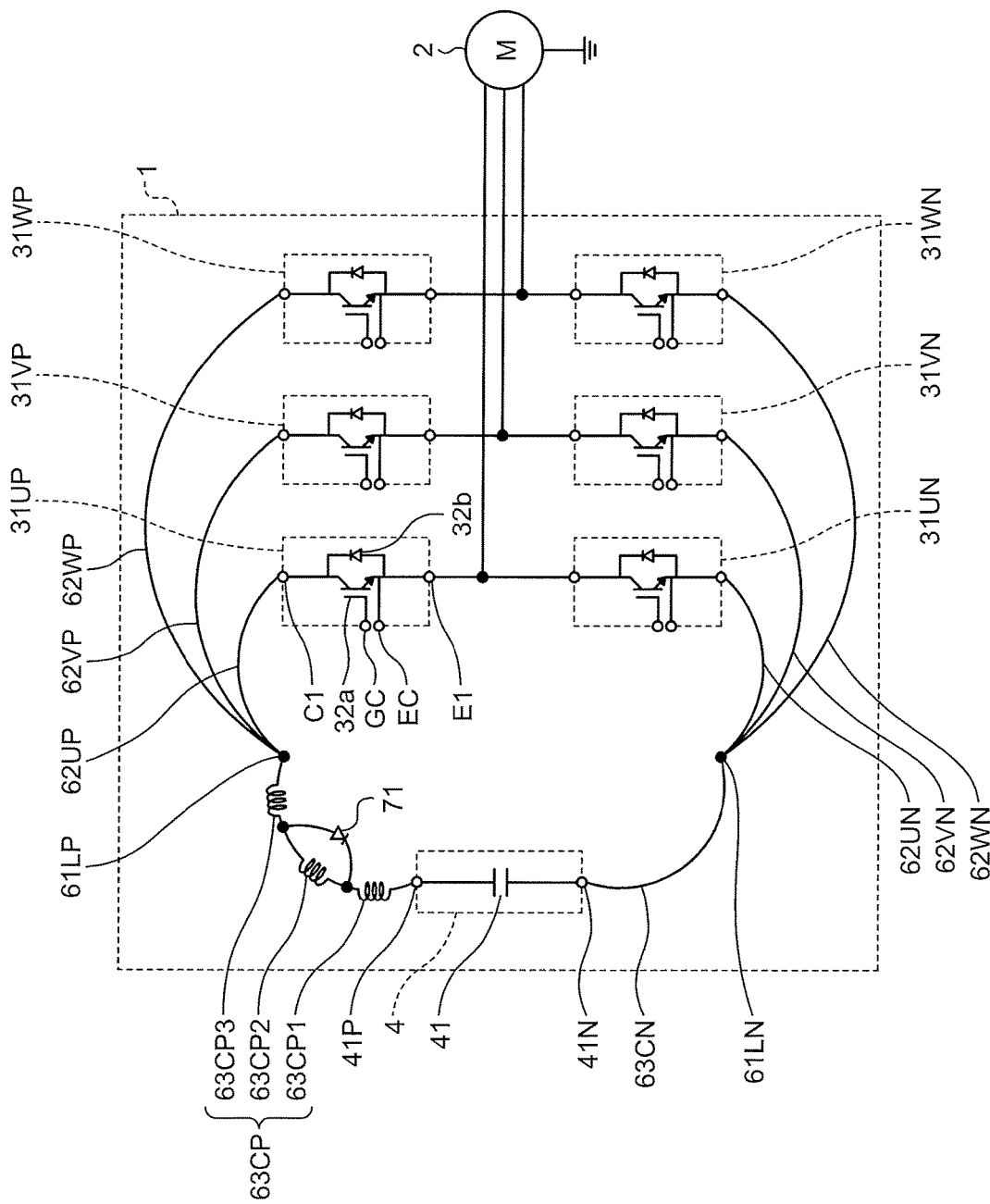
FIG. 4 is a diagram illustrating an example of a circuit configuration of a power conversion apparatus according to a second embodiment.

FIG. 4 is a diagram illustrating a circuit configuration of a power conversion apparatus according to a second embodiment. In the second embodiment, a diode 71 is used as the switching-current shunt component 70. Other configurations of the second embodiment are the same as or equivalent to those of the first embodiment, and the redundant descriptions thereof are omitted.

In FIG. 4, the diode 71 is attached in parallel to the wire parasitic inductance 63CP2. More specifically, the diode 71 is attached in such a manner that a cathode of the diode 71 faces the main-capacitor P-terminal 41P, and an anode of the diode 71 faces the P-side wire relay point 61LP.

Figure 5:
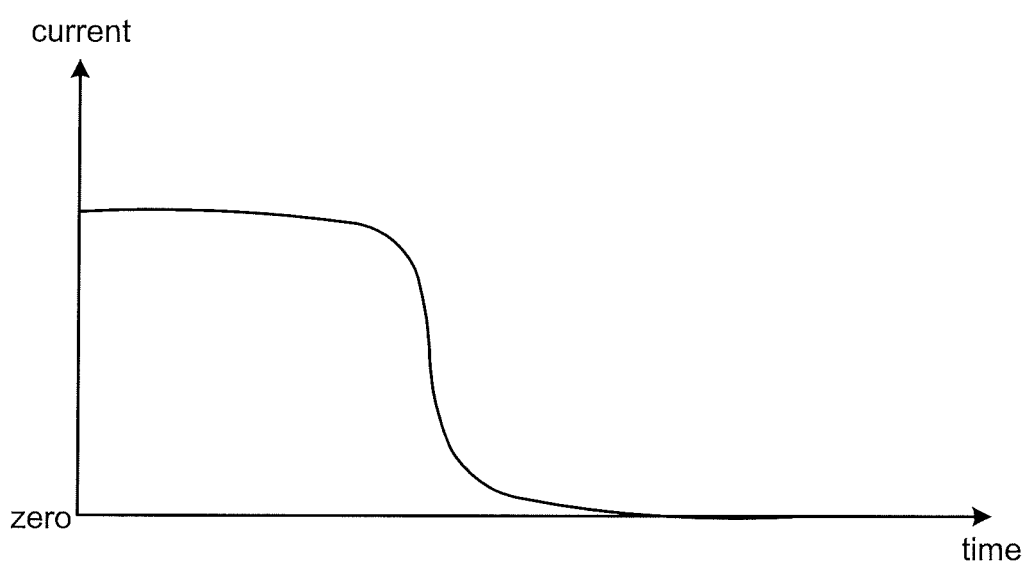
FIG. 5 is a diagram illustrating an example of a waveform of a switching current that flows through the power conversion apparatus according to the second embodiment.

Consider a case where the power semiconductor element 32a of the P-side U-phase power semiconductor module 31UP performs a turn-off switching operation with a DC current being supplied from the main capacitor 4 to the P-side U-phase power semiconductor module 31UP. FIG. 5 is a diagram illustrating an example of a waveform of a switching current that flows through the power conversion apparatus according to the second embodiment. The horizontal axis represents time, and the vertical axis represents a current value.

When the power semiconductor element 32a is turned off, a switching current flows through the P-side common wire 63CP as illustrated in FIG. 5. At this time, the switching current is a current that flows from the main-capacitor P-terminal 41P through the P-side common wire 63CP toward the P-side wire relay point 61LP. The value of the current is decreased by several tens of amperes to tens of thousands of amperes within a time as short as several nanoseconds to several tens of microseconds.

According to the law of electromagnetism, surge voltages are generated in the wire parasitic inductances 63CP1, 63CP2, and 63CP3. The surge voltage is generated in such a direction that the potential at the P-side wire relay point 61LP is higher than the potential at the main-capacitor P-terminal 41P. Therefore, the surge voltage is applied to the power semiconductor element 32a.

In the configuration in FIG. 4, a switching current that flows thorough the wire parasitic inductance 63CP2 is partially shunted to, and flows through, the diode 71. This results in a cyclic current that circulates through the wire parasitic inductance 63CP2, the anode of the diode 71, the cathode of the diode 71, and back to the wire parasitic inductance 63CP2. Due to this cyclic current, a switching current that flows through the wire parasitic inductance 63CP2 is reduced, and therefore a surge voltage generated in the wire parasitic inductance 63CP2 is reduced. As a result, a surge voltage applied to the power semiconductor element 32a is reduced.

As described also in the first embodiment, a DC voltage is not generated in the wires inside the power conversion apparatus 1 for a long time. Because a DC voltage is not generated in the P-side common wire 63CP for a long time, a DC voltage is not applied to the diode 71 for a long time. Therefore, in the power conversion apparatus 1 according to the second embodiment, the diode 71 can be constituted by low voltage-resistant components.

As described above, in the power conversion apparatus according to the second embodiment, the snubber that can reduce a surge voltage, to be applied to the component inside the power conversion apparatus, can be constituted by only low voltage-resistant components.

A DC current flows through the P-side common wire 63CP for a long time. As a common feature of the operation of diode components, a DC current does not flow in the direction from the cathode to the anode of the diode. That is, when a DC current flows through the P-side common wire 63CP in the direction from the main-capacitor P-terminal 41P to the P-side wire relay point 61LP, then a portion of the DC current does not flow through the diode 71. This prevents the occurrence of a conduction loss in the diode 71.

On the other hand, when a DC current flows through the P-side common wire 63CP in the direction from the P-side wire relay point 61LP to the main-capacitor P-terminal 41P, then a portion of the DC current flows through the diode 71. It is therefore desirable to use, as the diode 71, a diode with a high rising voltage such as a P-N junction diode, instead of using a diode with a low rising voltage such as a Schottky barrier diode. Using the P-N junction diode reduces the DC current that flows through the diode 71, and therefore reduces a conduction loss generated. This can suppress an increase in temperature of the diode 71, and can downsize the diode 71.

Third Embodiment

Figure 6:
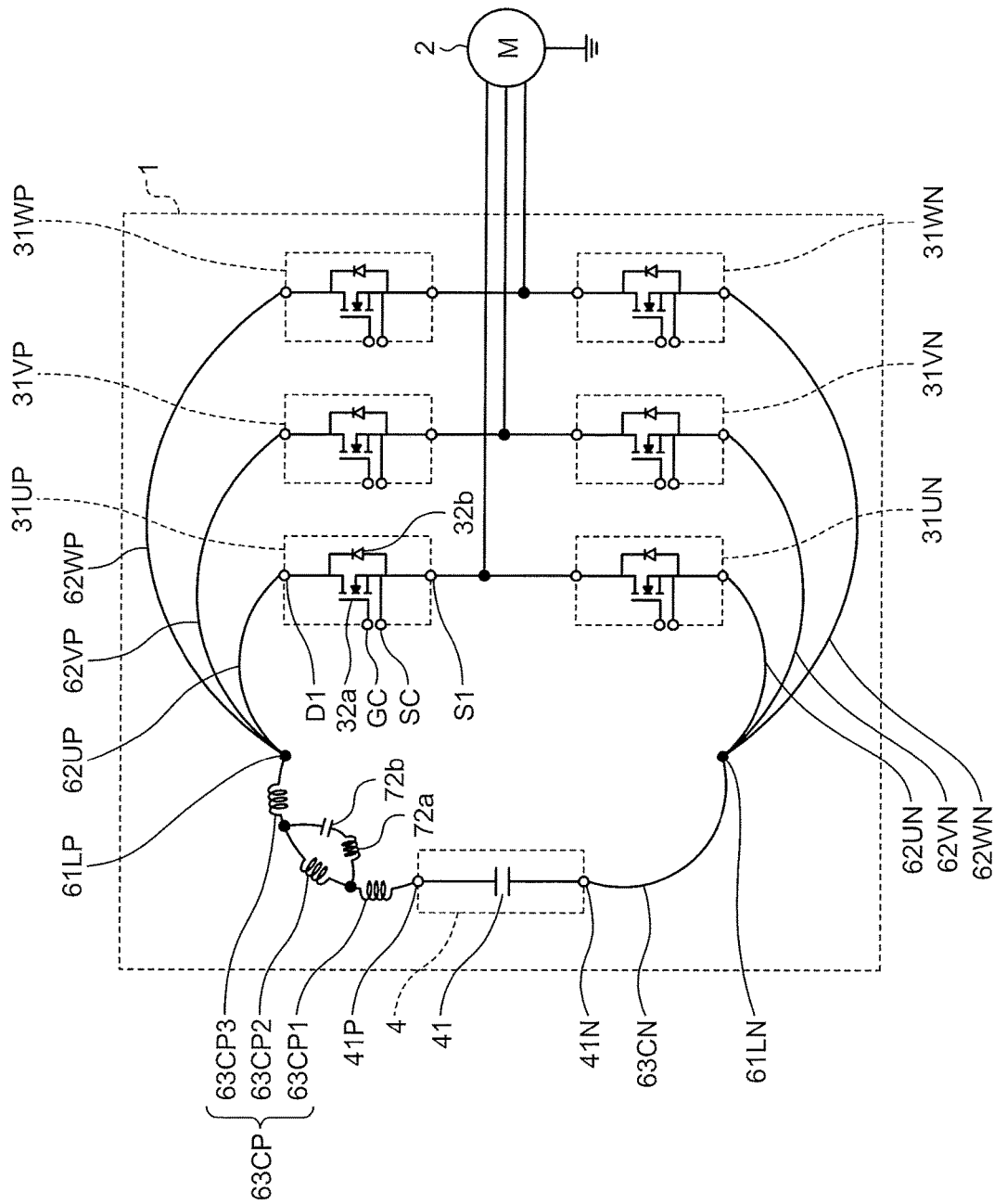
FIG. 6 is a diagram illustrating an example of a circuit configuration of a power conversion apparatus according to a third embodiment.

FIG. 6 is a diagram illustrating an example of a circuit configuration of a power conversion apparatus according to a third embodiment. In the third embodiment, an inductor 72a and a capacitor 72b that are connected in series are used as the switching-current shunt component 70. As the power semiconductor element 32a, a metal-oxide-semiconductor field-effect transistor (MOSFET) is used. The power semiconductor element 32a and the diode 32b are sealed with resin for the purpose of ensuring insulation properties and a mechanical strength. The power semiconductor element 32a and the diode 32b constitute the power semiconductor module 31. To electrically connect to an external circuit, the power semiconductor module 31 includes a drain terminal D1 that is a first terminal, a source terminal S1 that is a second terminal, the gate control terminal GC that is a first control terminal, and a source control terminal SC that is a second control terminal. The drain terminal D1, the source terminal S1, the gate control terminal GC, and the source control terminal SC are electrically connected to the power semiconductor element 32a and the diode 32b through the internal wires. Other configurations of the third embodiment are the same as or equivalent to those of the first embodiment. The same or equivalent constituent elements are denoted by like reference signs and the redundant descriptions thereof are omitted.

Figure 7:
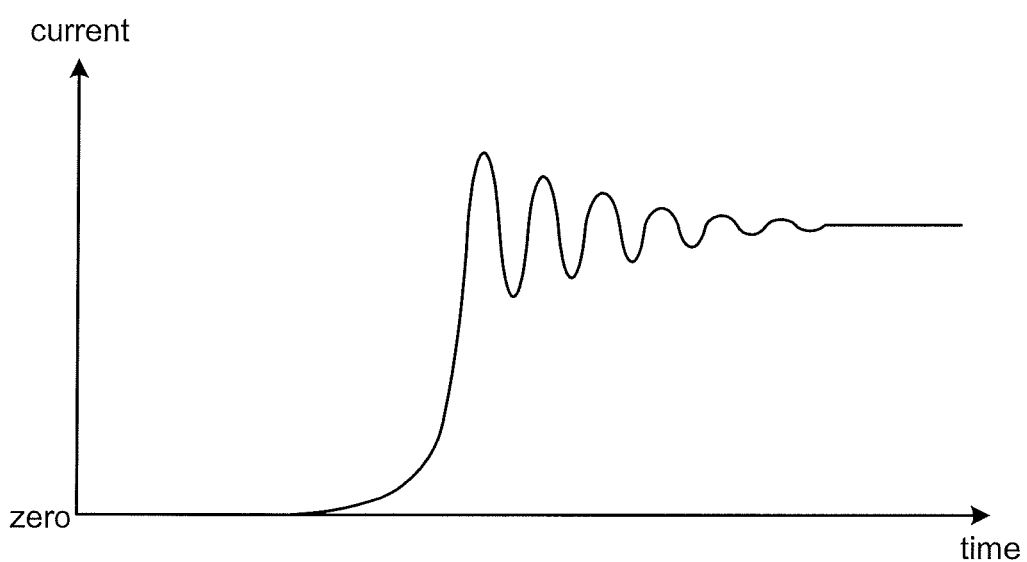
FIG. 7 is a diagram illustrating an example of a waveform of a switching current that flows through the power conversion apparatus according to the third embodiment.

FIG. 7 is a diagram illustrating an example of a waveform of a switching current that flows through the power conversion apparatus according to the third embodiment. The horizontal axis represents time, and the vertical axis represents a current value. When the power semiconductor element 32a that is a MOSFET performs a switching operation, a switching current that flows through the power semiconductor element 32a can oscillate as illustrated in FIG. 7. This oscillatory switching current is often referred to particularly as "ringing current". An oscillatory portion of the ringing current varies by several tens of amperes to tens of thousands of amperes within a time as short as several nanoseconds to several tens of microseconds. This is because the wire parasitic inductance, and the parasitic capacitance of the power semiconductor element, produce LC resonance. When the ringing current flows through a wire, a surge voltage is generated in the wire. The surge voltage also oscillates in the same manner as the ringing current, and therefore is often referred to particularly as "ringing voltage". The ringing current and the ringing voltage both oscillate at the same frequency.

In general, there is a parasitic capacitance in a transistor portion of the MOSFET, and there is also a parasitic capacitance in a parasitic diode portion of the MOSFET. When an external diode (the diode 32b in the example of FIG. 6) is connected in parallel to the MOSFET, there is also a parasitic capacitance in the external diode. At least one of these parasitic capacitances appears as a parasitic capacitance of the power semiconductor element. No matter which parasitic capacitance of the power semiconductor element appears, the parasitic capacitance shows a given value. The wire parasitic inductance also shows a given value. Therefore, the oscillation frequency of the ringing current and the ringing voltage shows a given value.

The power conversion apparatus 1 according to the third embodiment uses, as the switching-current shunt component 70, the inductor 72a and the capacitor 72b connected in series, and these inductor 72a and capacitor 72b are attached in parallel to the wire parasitic inductance 63CP2.

Consider a case where the aforementioned ringing current flows through the P-side common wire 63CP. The ringing current is an oscillatory current, and its current value varies by several tens of amperes to tens of thousands of amperes within a time as short as several nanoseconds to several tens of microseconds. According to the law of electromagnetism, ringing voltages are generated in the wire parasitic inductances 63CP1, 63CP2, and 63CP3. Therefore, the ringing voltage is applied to the power semiconductor element 32a. When the ringing voltage becomes excessive, the power semiconductor element 32a may be broken.

Meanwhile, in the configuration in FIG. 6, the ringing current that flows through the wire parasitic inductance 63CP2 is partially shunted to, and flows through, the series circuit of the inductor 72a and the capacitor 72b. This reduces the ringing current that flows through the wire parasitic inductance 63CP2, and therefore reduces the ringing voltage generated in the wire parasitic inductance 63CP2. As a result, the ringing voltage applied to the power semiconductor element 32a is reduced.

Further, as described in the first and second embodiments, a DC voltage is not generated in the wires inside the power conversion apparatus 1 for a long time. Because a DC voltage is not generated in the P-side common wire 63CP for a long time, a DC voltage is not applied to the series circuit of the inductor 72a and the capacitor 72b for a long time. Therefore, the inductor 72a and the capacitor 72b can be constituted by low voltage-resistant components.

As described above, in the power conversion apparatus according to the third embodiment, the snubber that can reduce a ringing voltage applied to the component inside the power conversion apparatus 1 can be constituted by only low voltage-resistant components.

A DC current flows through the P-side common wire 63CP for a long time. On the other hand, a DC current does not flow through the inductor 72a and the capacitor 72b that are connected in series. Therefore, a conduction loss attributable to a flow of the DC current is not caused in the series circuit of the inductor 72a and the capacitor 72b. Due to this configuration, the power conversion apparatus according to the third embodiment can suppress an increase in temperature of the inductor 72a and the capacitor 72b, and therefore can further downsize the inductor 72a and the capacitor 72b that are used as a switching-current shunt component.

Next, the matters to be taken into consideration for selecting the inductor 72a and the capacitor 72b are described. In selecting the inductor 72a and the capacitor 72b, it is desirable to adjust their respective codes such that the LC resonance frequency of the inductor 72a and the capacitor 72b is the same as the oscillation frequency of the ringing current (switching current), and it is preferable that at least an oscillation frequency component of the ringing current is included within a half bandwidth of the LC resonance frequency. The half bandwidth of the LC resonance frequency, as used herein, refers to a frequency bandwidth that, when expressed in terms of a function of a frequency and an attenuation rate of an LC filter, includes up to frequencies at which attenuation rates of the LC filter are half vales of an attenuation rate at an LC resonance frequency that is the center of the half bandwidth of the LC resonance frequency. The oscillation frequency of the ringing current can be calculated by, for example, measuring the oscillation frequency in advance through a switching test without any switching-current shunt component being provided. This minimizes a synthetic impedance of the inductor 72a and the capacitor 72b connected in series, at the oscillation frequency of the ringing current, such that the ringing current shunted to the series circuit of the inductor 72a and the capacitor 72b increases to thereby reduce the ringing current that flows through the wire parasitic inductance 63CP2. This function improves the effect of reducing the ringing voltage generated in the wire parasitic inductance 63CP2.

In the case where there are a plurality of oscillatory components of the switching current, it is preferable to select one of the oscillatory components, which has the greatest time rate of change of the switching current. When the LC resonance frequency of the inductor 72a and the capacitor 72b is adjusted so as to be the same as the frequency of that oscillatory component, the surge-voltage reduction effect can further be improved.

An inductor and a capacitor that are connected in series may be added as a further switching-current shunt component 70. In this case, the LC resonance frequency of the added inductor and capacitor is determined so as to be the same as the frequency of the oscillatory component having the second greatest time rate of change of the switching current. As a result, the surge-voltage reduction effect can further be improved.

It is desirable that a parasitic inductance of the wire, used for attaching the capacitor 72b to the wire parasitic inductance 63CP2, is utilized as the inductor 72a that is to be connected in series to the capacitor 72b. This eliminates the need to prepare a separate inductor component as the inductor 72a that is to be connected in series to the capacitor 72b. In this case, adjusting the code of the capacitor 72b enables the LC resonance frequency, attributable to the capacitance and the inductance of the capacitor 72b, to be the same as the oscillation frequency of the ringing current.

Fourth Embodiment

Figure 8:
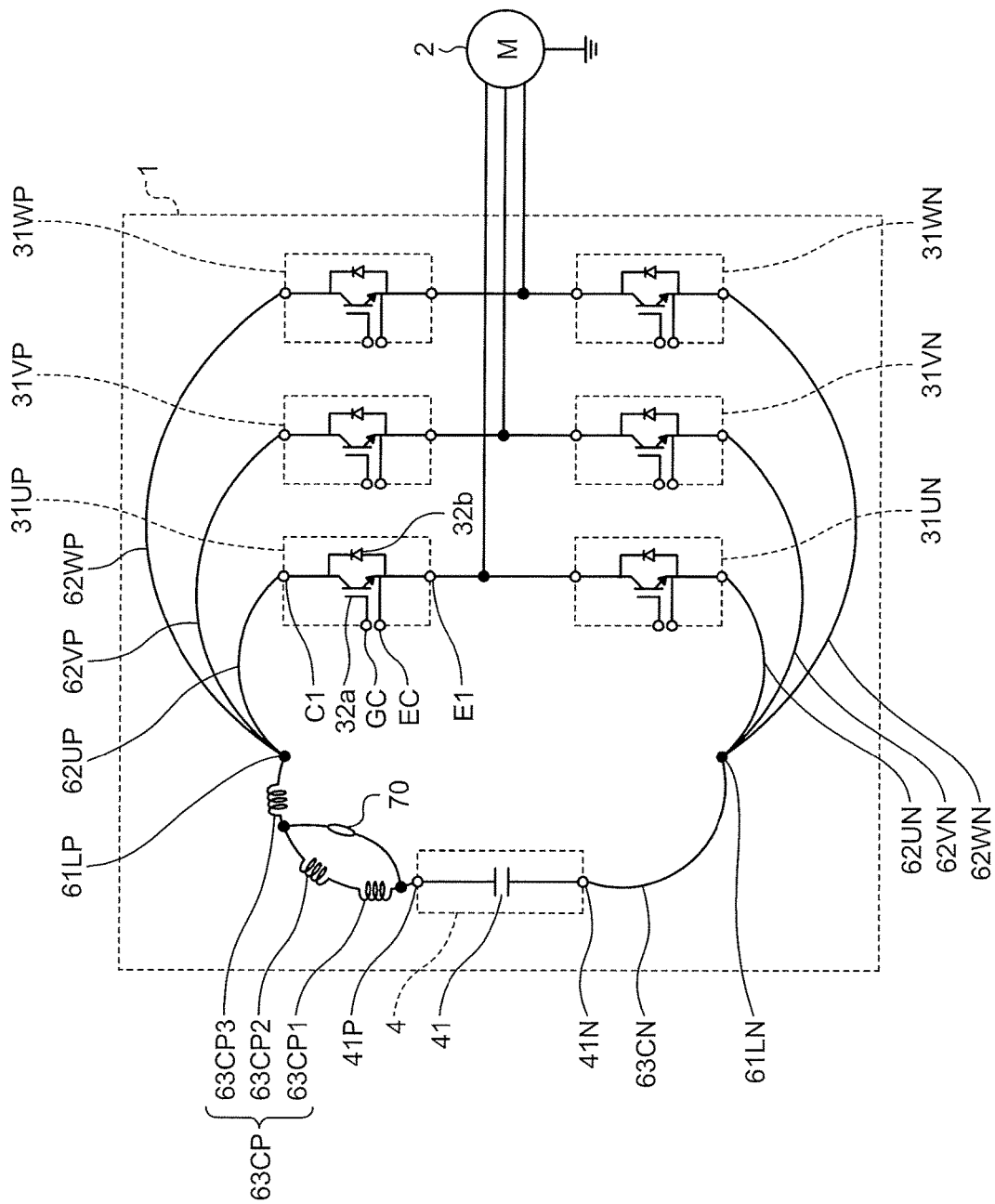
FIG. 8 is a diagram illustrating an example of a circuit configuration of a power conversion apparatus according to a fourth embodiment.
Figure 9:
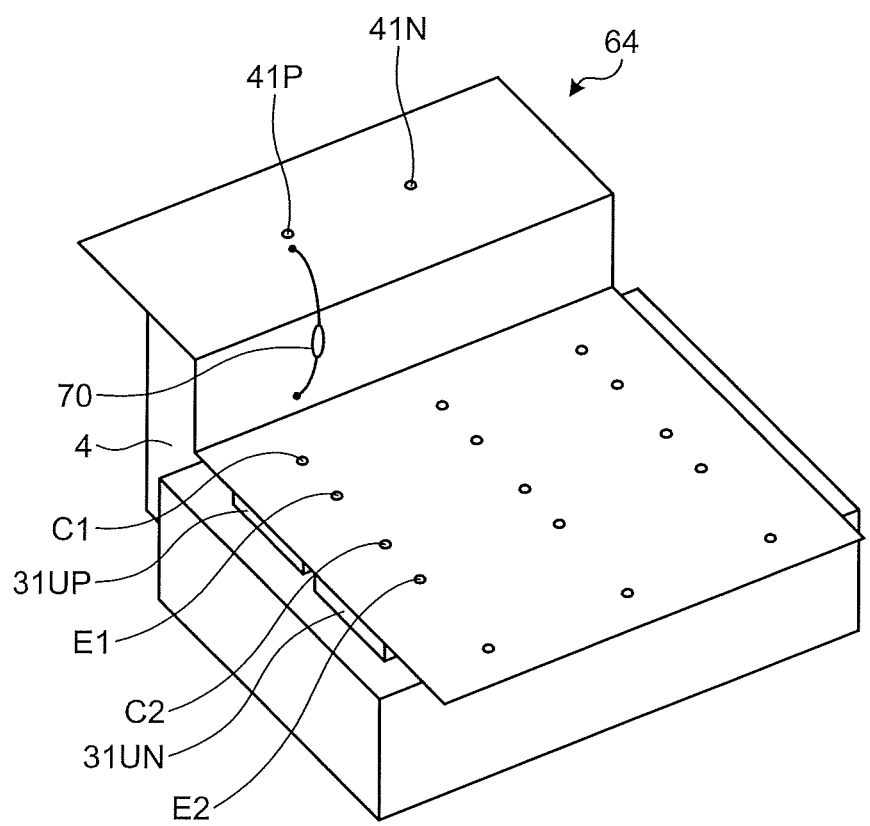
FIG. 9 is a perspective view illustrating a configuration example of the power conversion apparatus according to the fourth embodiment.

FIG. 8 is a diagram illustrating an example of a circuit configuration of a power conversion apparatus according to a fourth embodiment. FIG. 9 is a perspective view illustrating a configuration example of the power conversion apparatus according to the fourth embodiment. Also in the fourth embodiment, a switching-current shunt component is connected in parallel to a wire through which a switching current flows. The feature of the fourth embodiment is that at least one of the two connection points between the switching-current shunt component and the wire through which a switching current flows is provided in an (immediate) vicinity of the main capacitor. Other configurations of the fourth embodiment are the same as or equivalent to those of the first embodiment. The same or equivalent constituent elements are denoted by like reference signs and the redundant descriptions thereof are omitted.

The configuration of the power conversion apparatus according to the fourth embodiment is described in more detail. First, the switching-current shunt component 70 is connected in parallel to the P-side common wire 63CP. Similarly to the first embodiment, the P-side common wire 63CP is regarded as being made up of the wire parasitic inductances 63CP1, 63CP2, and 63CP3. Further, similarly to the first embodiment, one of the two connection points of the switching-current shunt component 70 is located between the wire parasitic inductance 63CP2 and the wire parasitic inductance 63CP3.

On the other hand, the fourth embodiment is different from the first embodiment in that the other of the two connection points of the switching-current shunt component 70 is not connected between the wire parasitic inductance 63CP2 and the wire parasitic inductance 63CP1, but is connected to the vicinity of the main-capacitor P-terminal 41P of the main capacitor 4.

In the above descriptions, the phrase "(immediate) vicinity of the main-capacitor P-terminal 41P" includes the main-capacitor P-terminal 41P and, for example, a location away from the main-capacitor P-terminal 41P by a distance equal to or less than a distance between the main-capacitor P-terminal 41P and the main-capacitor N-terminal 41N that forms a pair with the main-capacitor P-terminal 41P of the main capacitor 4. That is, this location corresponds to the other of those two connection points of the switching-current shunt component 70 when the distance between the other connection point of the switching-current shunt component 70 and the main-capacitor P-terminal 41P is equal to or less than the distance between the main-capacitor P-terminal 41P and the main-capacitor N-terminal 41N. The connection point, which satisfies the condition as described above, can be considered to be the same as the main-capacitor P-terminal 41P.

When the P-side common wire 63CP is screwed to the main-capacitor P-terminal 41P, the same screw may be used to screw the wire of the switching-current shunt component 70 to the main-capacitor P-terminal 41P. As a result, the other of the two connection points between the switching-current shunt component 70 and the wire through which a switching current flows can be provided in the vicinity of the main capacitor 4. The same connection configuration can be employed where the switching-current shunt component 70 is connected in parallel to the N-side common wire 63CN.

Upon a switching operation of the P-side power semiconductor element, a switching current flows through the P-side common wire 63CP. This switching current flows through the wire parasitic inductances 63CP1, 63CP2, and 63CP3. According to the law of electromagnetism, surge voltages are generated in the wire parasitic inductances 63CP1, 63CP2, and 63CP3. In the configuration of the fourth embodiment, a portion of the switching current is shunted to, and flows through, the switching-current shunt component 70. Therefore, the switching current that flows through the wire parasitic inductances 63CP1 and 63CP2 is reduced. Accordingly, the surge voltages generated in the wire parasitic inductances 63CP1 and 63CP2 can be reduced. Consequently, the power conversion apparatus according to the fourth embodiment can improve the surge-voltage reduction effect as compared to the power conversion apparatus according to the first embodiment.

Fifth Embodiment

Figure 10:
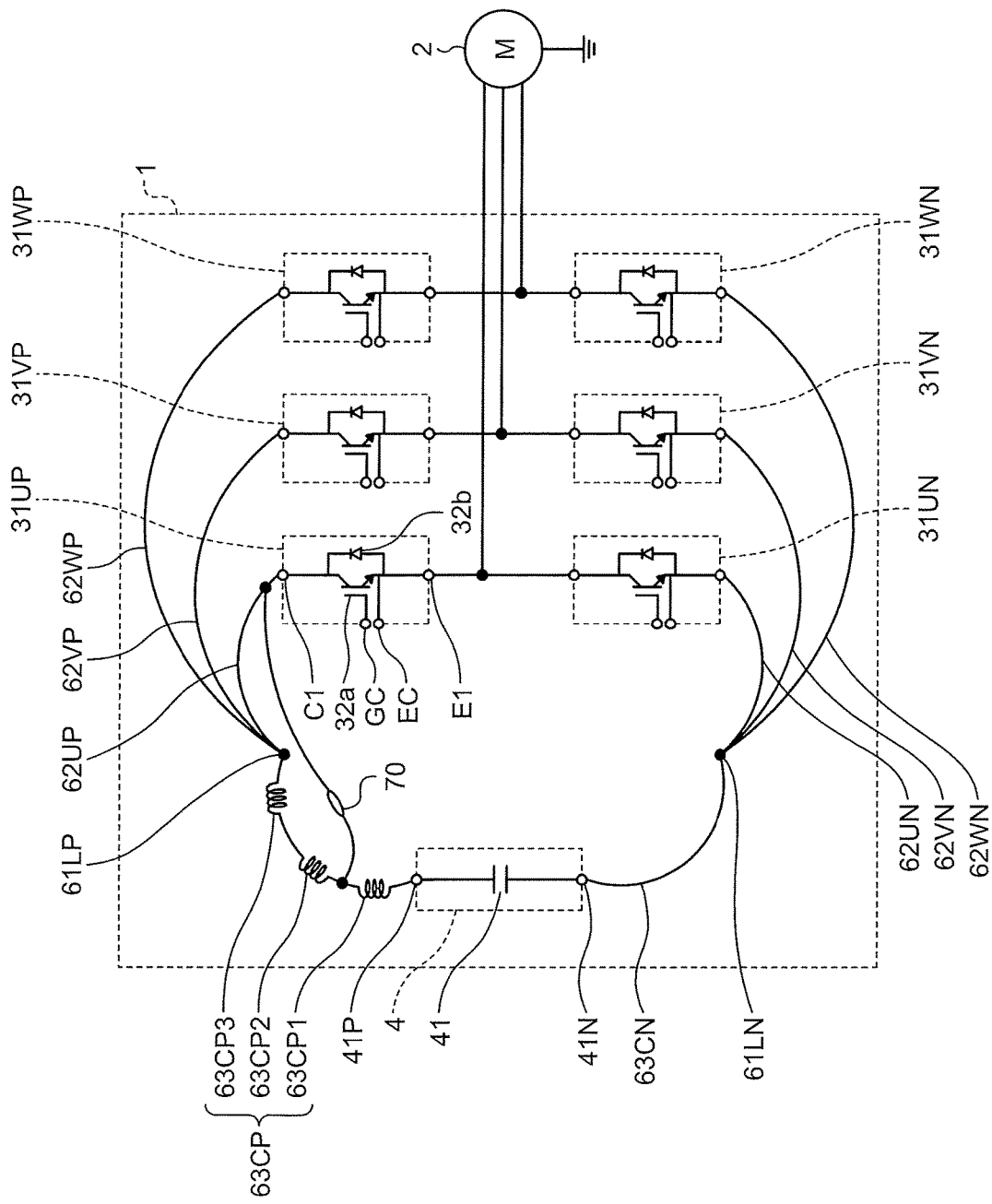
FIG. 10 is a diagram illustrating an example of a circuit configuration of a power conversion apparatus according to a fifth embodiment.
Figure 11:
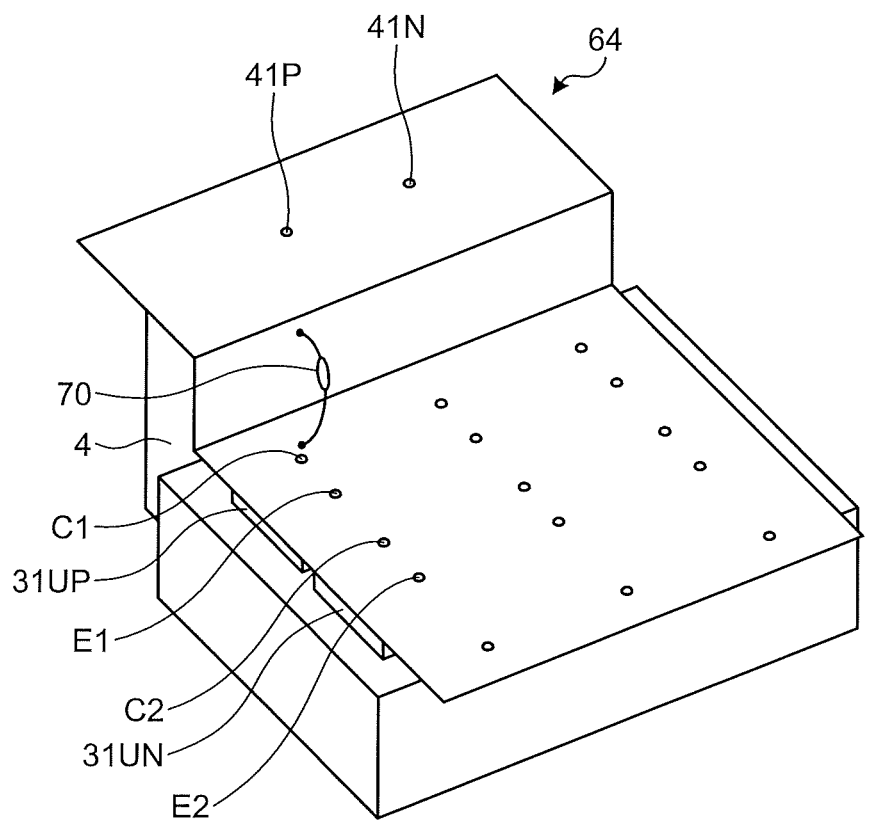
FIG. 11 is a perspective view illustrating a configuration example of the power conversion apparatus according to the fifth embodiment.

FIG. 10 is a diagram illustrating an example of a circuit configuration of a power conversion apparatus according to a fifth embodiment. FIG. 11 is a perspective view illustrating a configuration example of the power conversion apparatus according to the fifth embodiment. Also in the fifth embodiment, the switching-current shunt component 70 is connected in parallel to a wire through which a switching current flows. The feature of the fifth embodiment is that at least one of the two connection points between the switching-current shunt component 70 and the wire through which a switching current flows is provided in an (immediate) vicinity of the power semiconductor element. Other configurations of the fifth embodiment are the same as or equivalent to those of the first embodiment. The same or equivalent constituent elements are denoted by like reference signs and the redundant descriptions thereof are omitted.

The configuration of the power conversion apparatus according to the fifth embodiment is described in more detail. First, similarly to the first embodiment, the P-side common wire 63CP is regarded as being made up of the wire parasitic inductances 63CP1, 63CP2, and 63CP3. Further, similarly to the first embodiment, one of the two connection points of the switching-current shunt component 70 is located between the wire parasitic inductance 63CP1 and the wire parasitic inductance 63CP2.

On the other hand, the fifth embodiment is different from the first embodiment in that the other of the two connection points of the switching-current shunt component 70 is not connected between the wire parasitic inductance 63CP2 and the wire parasitic inductance 63CP3, but is connected to the P-side U-phase wire 62UP in the vicinity of the collector terminal C1 of the P-side U-phase power semiconductor module 31UP.

In the above descriptions, the phrase "(immediate) vicinity of the collector terminal C1" includes the collector terminal C1 and, for example, a location away from the collector terminal C1 by a distance equal to or less than the distance between the collector terminal C1 and the emitter terminal E1 that is a terminal forming a pair with the collector terminal C1 of the power semiconductor module 31UP. That is, this location corresponds to the other of the two connection points of the switching-current shunt component 70 when the distance between the other connection point of the switching-current shunt component 70 and the collector terminal C1 is equal to or less than the distance between the collector terminal C1 and the emitter terminal E1 of the P-side U-phase power semiconductor module 31UP. The connection point, which satisfies the condition as described above, can be considered to be the same as the collector terminal C1.

When the P-side U-phase wire 62UP is screwed to the collector terminal C1 of the P-side U-phase power semiconductor module 31UP, the same screw may be used to screw the wire of the switching-current shunt component 70 to the collector terminal C1. As a result, the other of the two connection points between the switching-current shunt component 70 and the wire through which a switching current flows can be provided in the vicinity of the collector terminal C1. The same connection configuration can be employed where the switching-current shunt component 70 is connected in parallel to the N-side common wire 63CN and the N-side U-phase wire 62UN.

Upon a switching operation of the P-side power semiconductor element, a switching current flows through the P-side common wire 63CP and the P-side U-phase wire 62UP. According to the law of electromagnetism, surge voltages are generated in the P-side common wire 63CP and the P-side U-phase wire 62UP. In the configuration of the power conversion apparatus according to the fifth embodiment, because a portion of the switching current is shunted to, and flows through, the switching-current shunt component 70, the surge voltages generated in the P-side common wire 63CP and the P-side U-phase wire 62UP can be reduced. Therefore, the power conversion apparatus according to the fifth embodiment can improve the surge-voltage reduction effect as compared to the power conversion apparatus according to the first embodiment.

Figure 12:
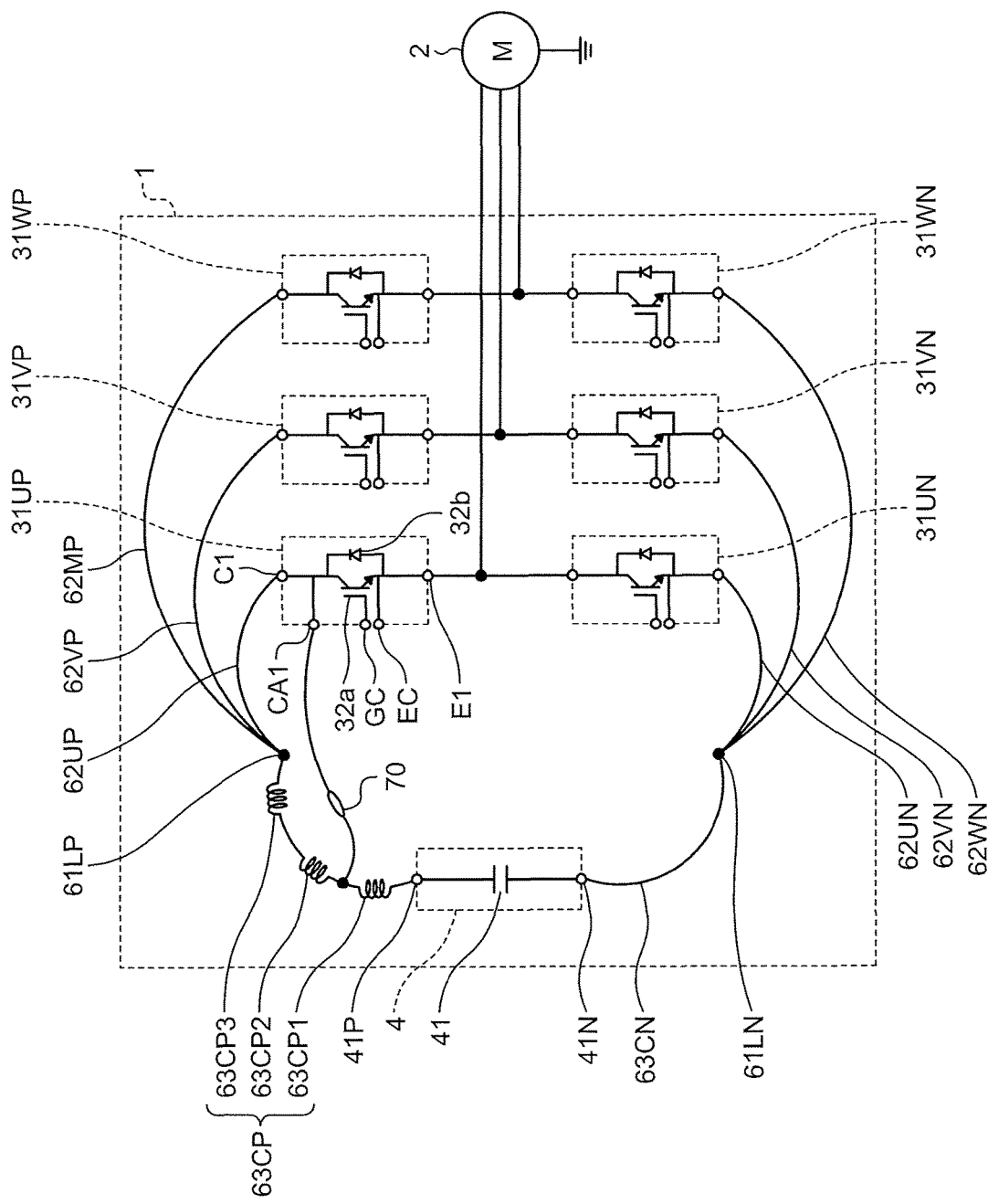
FIG. 12 is a diagram illustrating another example of the circuit configuration of the power conversion apparatus according to the fifth embodiment.

FIG. 12 is a diagram illustrating another example of the circuit configuration of the power conversion apparatus according to the fifth embodiment. Some power semiconductor modules include a collector auxiliary terminal in addition to the collector terminal. This type of power semiconductor module is designed on the assumption that a high current flows for a long time through a wire that connects the collector terminal and the power semiconductor element. Therefore, a thicker wire member is used as a wire that connects the collector terminal and the power semiconductor element, such that the wire resistance is lower. Meanwhile, the collector auxiliary terminal is a terminal intended to detect a collector potential in the power semiconductor element, and is different from the collector terminal. More specifically, the power semiconductor module is designed on the assumption that a low current, but enough to detect the collector potential in the power semiconductor element, flows through the wire that connects the collector auxiliary terminal and the power semiconductor element. Therefore, as the wire that connects the collector auxiliary terminal and the power semiconductor element, a thinner wire member is normally used than the wire that connects the collector terminal and the power semiconductor element.

In the configuration illustrated in FIG. 12, one of the two connection points of the switching-current shunt component 70 is connected to a collector auxiliary terminal CA1. The other of the two connection points of the switching-current shunt component 70 is at the same location as in FIG. 10. In the configuration in FIG. 12, the switching-current shunt component 70 can be regarded as being connected in parallel to the P-side common wire 63CP, the P-side U-phase wire 62UP, and the wire that connects the collector terminal C1 and the power semiconductor element 32a (hereinafter, "collector internal wire" for convenience sake). While a switching current flows through the P-side common wire 63CP, the P-side U-phase wire 62UP, and the collector internal wire, a portion of the switching current is shunted to the switching-current shunt component 70. As a result, surge voltages generated in the P-side common wire 63CP, the P-side U-phase wire 62UP, and the collector internal wire can be reduced. The surge-voltage reduction effect produced by the configuration illustrated in FIG. 12 is greater than the surge-voltage reduction effect produced by the configuration illustrated in FIG. 10.

Sixth Embodiment

Figure 13:
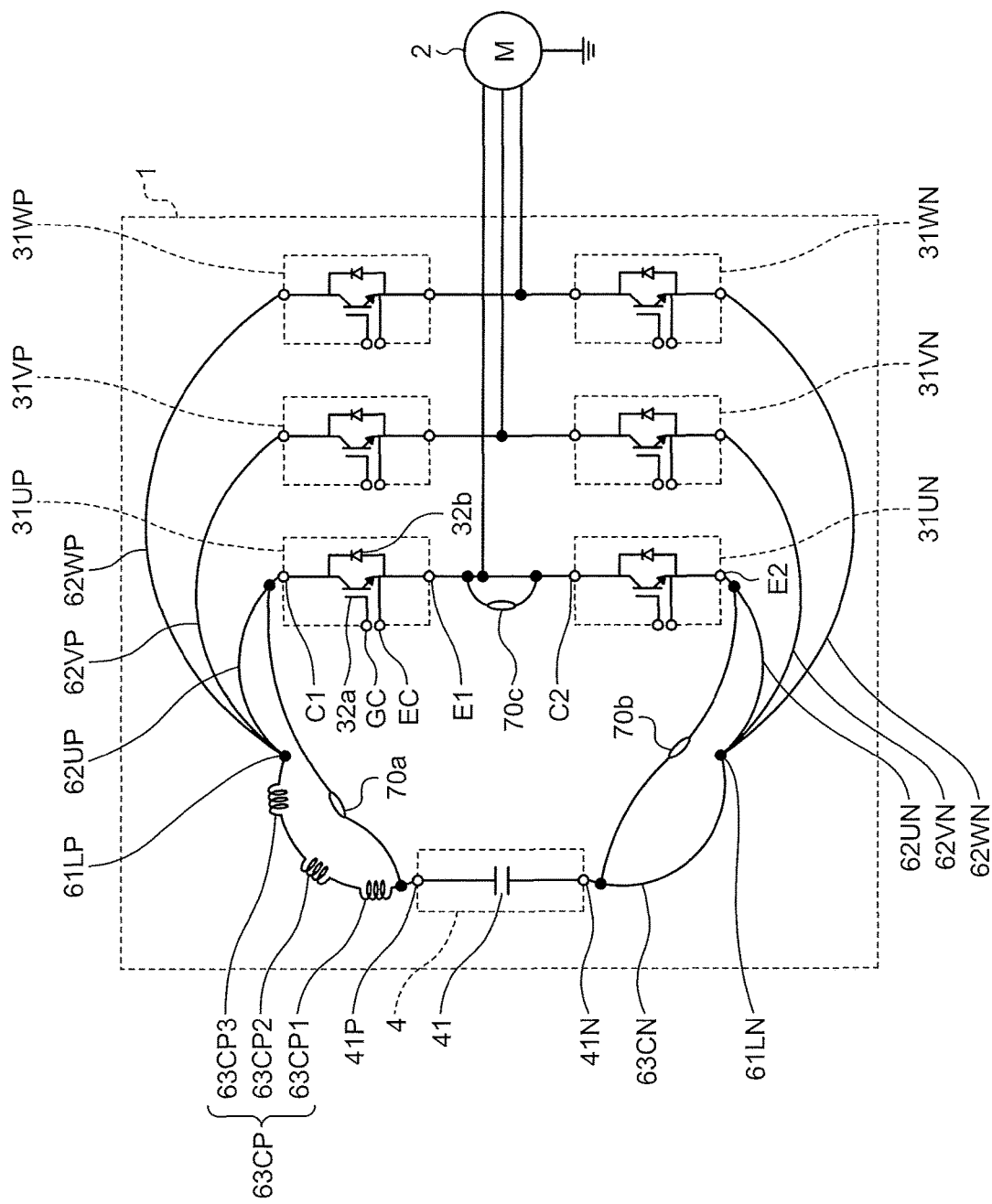
FIG. 13 is a diagram illustrating an example of a circuit configuration of a power conversion apparatus according to a sixth embodiment.
Figure 14:
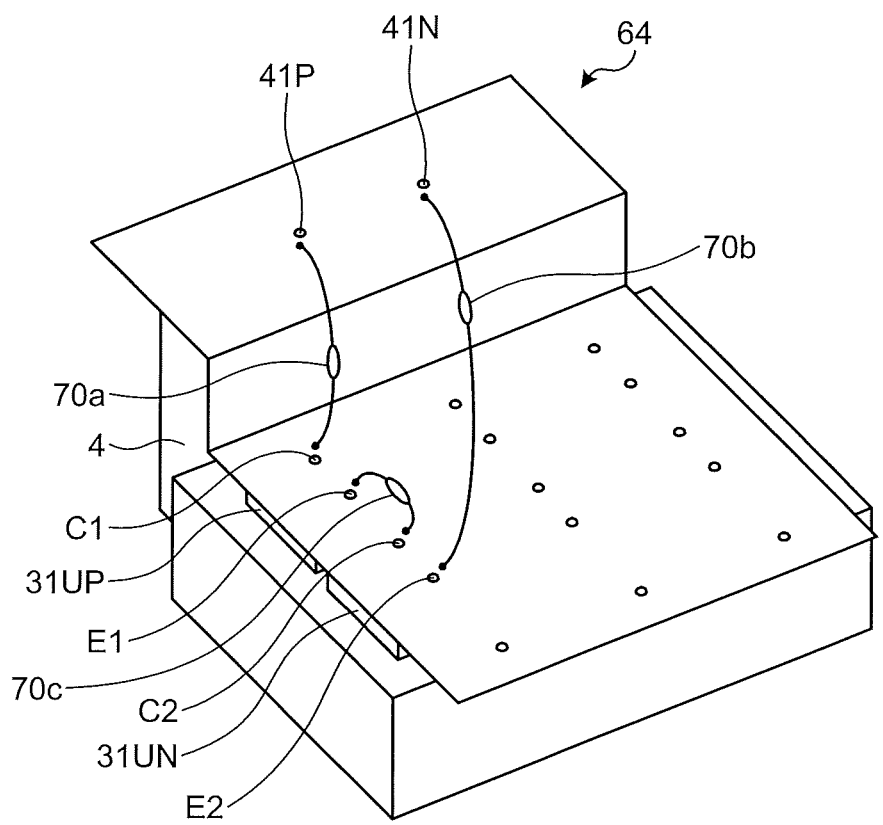
FIG. 14 is a perspective view illustrating a configuration example of the power conversion apparatus according to the sixth embodiment.

FIG. 13 is a diagram illustrating an example of a circuit configuration of a power conversion apparatus according to a sixth embodiment. FIG. 14 is a perspective view illustrating a configuration example of the power conversion apparatus according to the sixth embodiment. Also in the sixth embodiment, switching-current shunt components 70 (70a, 70b, and 70c) are individually connected in parallel to the respective wires through which a switching current flows. That is, the first feature of the sixth embodiment is that there are a plurality of wires to which the switching-current shunt components 70 are respectively connected in parallel, and the second feature of the sixth embodiment is that, while the switching-current shunt components 70 are connected in parallel only to the DC-side connection wire members (the positive-side connection wire member and the negative-side connection wire member) in the first to fifth embodiment, the switching-current shunt components 70 according to the sixth embodiment are connected in parallel to AC-side connection wire members as well. Other configurations of the sixth embodiment are the same as or equivalent to those of the first embodiment. The same or equivalent constituent elements are denoted by like reference signs and the redundant descriptions thereof are omitted.

The configuration of the power conversion apparatus according to the sixth embodiment is described in more detail. As described above, in the sixth embodiment, the power conversion apparatus 1 includes the three switching-current shunt components 70a, 70b, and 70c. The switching-current shunt component 70a that is a first switching-current shunt component is connected in parallel to the wire that connects the main-capacitor P-terminal 41P and the collector terminal C1 of the P-side U-phase power semiconductor module 31UP. That is, the switching-current shunt component 70a is connected in parallel to the P-side common wire 63CP and the P-side U-phase wire 62UP. The switching-current shunt component 70b that is a second switching-current shunt component is connected in parallel to the wire that connects the main-capacitor N-terminal 41N and the emitter terminal E2 of the N-side U-phase power semiconductor module 31UN. That is, the switching-current shunt component 70b is connected in parallel to the N-side common wire 63CN and the N-side U-phase wire 62UN. The switching-current shunt components 70a and 70b are switching-current shunt components to be connected in parallel to the DC-side connection wire member. Further, the switching-current shunt component 70c that is a third switching-current shunt component is connected in parallel to the wire that connects the emitter terminal E1 of the P-side U-phase power semiconductor module 31UP and the collector terminal C2 of the N-side U-phase power semiconductor module 31UN. The switching-current shunt component 70c is a switching-current shunt component connected in parallel to the AC-side connection wire member. The AC-side connection wire members include wires in the power semiconductor modules and wires that connect the power semiconductor modules to each other. In the present embodiment, the switching-current shunt component 70c is provided to be connected in parallel to, among these AC-side connection wire members, the AC-side connection wire member that connects the power semiconductor modules to each other.

Upon a switching operation of the power semiconductor module 32a, a switching current flows through the wires described above. According to the law of electromagnetism, surge voltages are generated in these wires. In the configuration of the sixth embodiment, a portion of the switching current is shunted to, and flows through, at least one of the switching-current shunt components 70a, 70b, and 70c. This can reduce the surge voltage generated in each wire. As described above, since there is a plurality of the wires in each of which the surge voltage is reduced, the power conversion apparatus according to the sixth embodiment can improve the surge-voltage reduction effect as compared to the power conversion apparatus according to the first embodiment.

Figure 15:
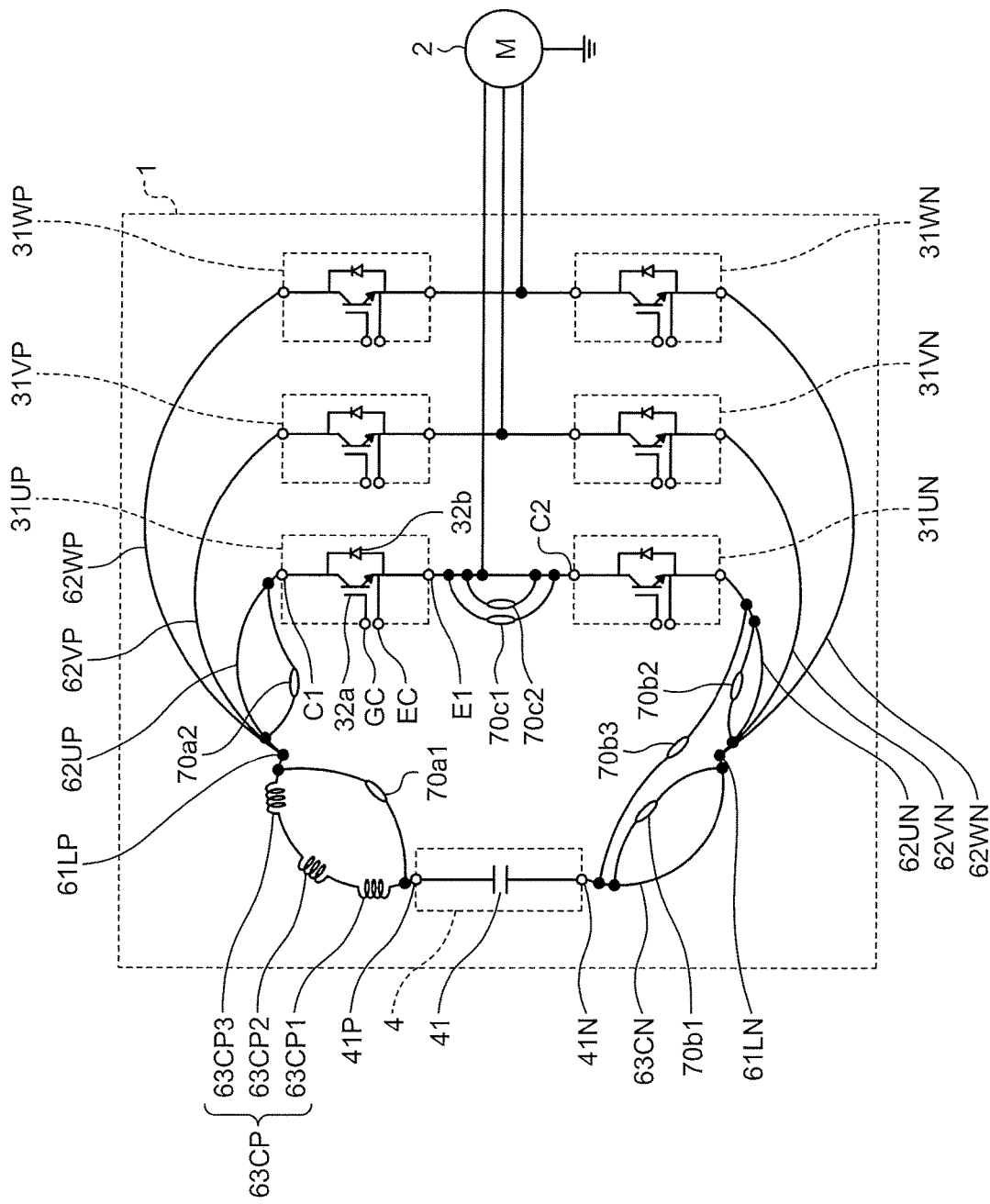
FIG. 15 is a diagram illustrating another example of the circuit configuration of the power conversion apparatus according to the sixth embodiment.

FIG. 15 is a diagram illustrating another example of the circuit configuration of the power conversion apparatus according to the sixth embodiment. In the configuration illustrated in FIG. 13, a single switching-current shunt component 70a is attached so as to span a region from the P-side common wire 63CP to the P-side U-phase wire 62UP. This configuration can reduce the surge voltages generated in the P-side common wire 63CP and the P-side U-phase wire 62UP. Meanwhile, in some cases, the components of the power conversion apparatus 1 are complicatedly laid out in various manners, and therefore it may be difficult to attach a single switching-current shunt component 70a so as to span the region from the P-side common wire 63CP to the P-side U-phase wire 62UP. In this case, a single switching-current shunt component 70a1 can be attached to the P-side common wire 63CP, while an additional switching-current shunt component 70a2 can be attached to the P-side U-phase wire 62UP, as illustrated in FIG. 15. This configuration can also reduce the surge voltages generated in the P-side common wire 63CP and the P-side U-phase wire 62UP.

In the configuration illustrated in FIG. 13, the single switching-current shunt component 70c is connected in parallel to the wire that connects the emitter terminal E1 of the P-side U-phase power semiconductor module 31UP and the collector terminal C2 of the N-side U-phase power semiconductor module 31UN. In the configuration illustrated in FIG. 15, two switching-current shunt components 70c1 and 70c2 are connected in parallel to the wire that connects the emitter terminal E1 of the P-side U-phase power semiconductor module 31UP and the collector terminal C2 of the N-side U-phase power semiconductor module 31UN. Therefore, the number of switching-current shunt components is larger than the configuration illustrated in FIG. 13. A switching current flows through the wire that connects the emitter terminal E1 of the P-side U-phase power semiconductor module 31UP and the collector terminal C2 of the N-side U-phase power semiconductor module 31UN. In the configuration illustrated in FIG. 15, a larger switching current is shunted to the switching-current shunt components 70c (70c1 and 70c2). Therefore, the configuration illustrated in FIG. 15 can improve the effect of reducing the surge voltage generated in the wire that connects the emitter terminal E1 of the P-side U-phase power semiconductor module 31UP and the collector terminal C2 of the N-side U-phase power semiconductor module 31UN, as compared to the configuration illustrated in FIG. 13.

The two switching-current shunt components 70c1 and 70c2 may be both constituted by diodes. Using the diodes enables shunting of non-oscillatory switching currents. Each of the two switching-current shunt components 70c1 and 70c2 may be constituted by an inductor and a capacitor that are connected in series. Using the inductor and the capacitor that are connected in series enables shunting of oscillatory switching currents, that is, ringing currents.

One of the two switching-current shunt components 70c1 and 70c2 may be constituted by a diode, while the other may be constituted by an inductor and a capacitor that are connected in series. This constitution enables shunting of both a non-oscillatory switching current and an oscillatory switching current. As described above, a plurality of switching-current shunt components may be constituted by components having identical electric properties, or may be constituted by components having different electric properties.

Further, in the configuration illustrated in FIG. 15, a single switching-current shunt component 70b1 is attached to the N-side common wire 63CN, and a single switching-current shunt component 70b2 is attached to the N-side U-phase wire 62UN. Furthermore, a single switching-current shunt component 70b3 is attached so as to span a region from the N-side common wire 63CN to the N-side U-phase wire 62UN. A plurality of the switching-current shunt components may be combined in series and in parallel to each other in this manner. A switching current flows through the N-side common wire 63CN and the N-side U-phase wire 62UN while larger switching currents can be shunted to the switching-current shunt components 70b (70b1, 70b2, and 70b3). Therefore, the power conversion apparatus 1 illustrated in FIG. 15 can improve the surge-voltage reduction effect as compared to the power conversion apparatus 1 illustrated in FIG. 13.

The switching-current shunt component 70 may be attached to a V-phase wire. This configuration reduces a surge voltage generated in the V-phase wire, and thus a surge voltage applied to a V-phase component. Further, the switching-current shunt component 70 may be attached to a W-phase wire. This configuration reduces a surge voltage generated in the W-phase wire, and thus a surge voltage applied to a W-phase component.

In Particular, attaching the switching-current shunt component 70 to a common wire between the U-phase, V-phase, and W-phase can reduce the surge voltages applied to the U-phase, V-phase, and W-phase components. With this configuration, the number of the switching-current shunt components 70 can be reduced as compared to the case where the switching-current shunt components 70 are attached individually to the respective U-phase, V-phase, and W-phase wires.

Seventh Embodiment

Figure 16:
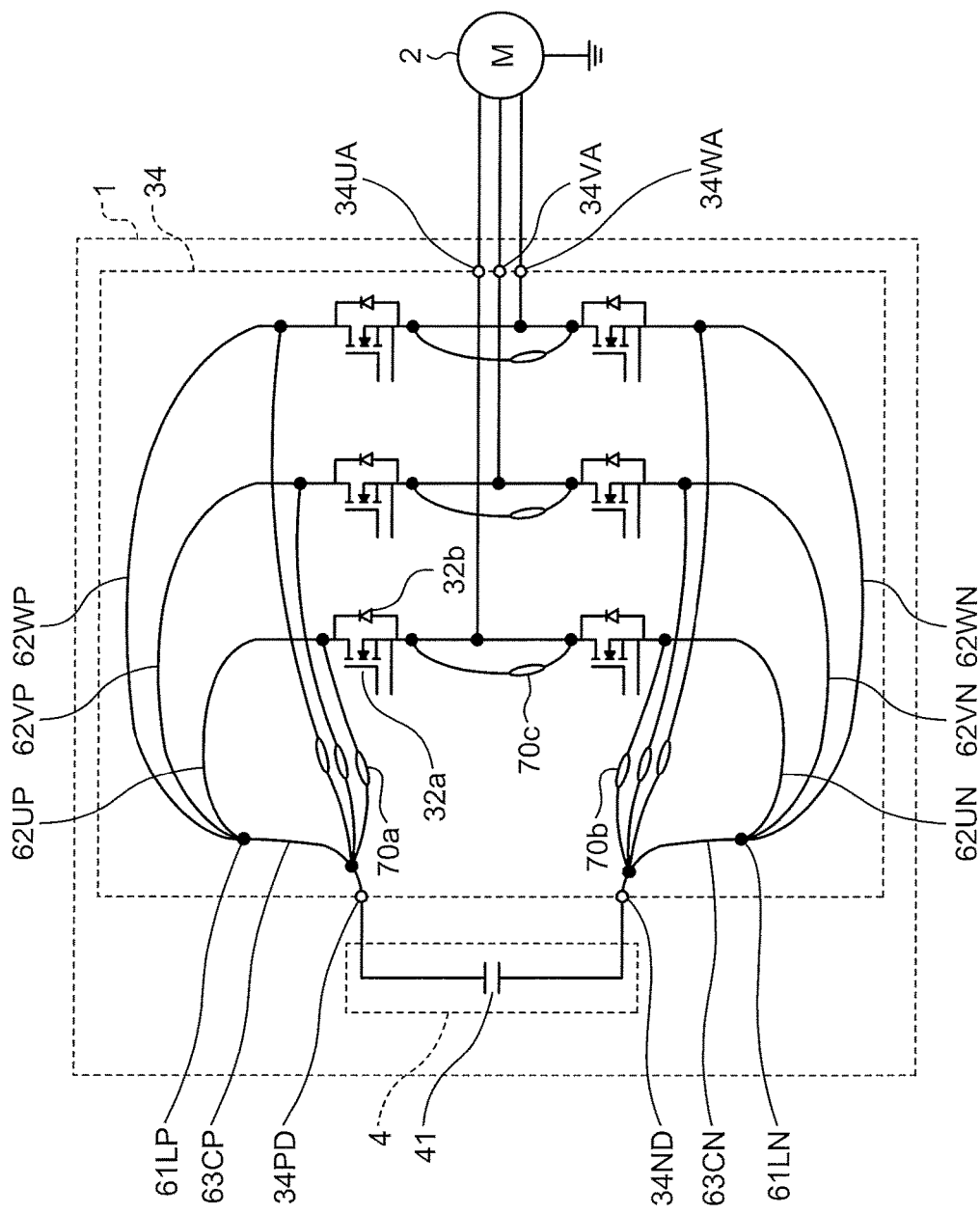
FIG. 16 is a diagram illustrating an example of a circuit configuration of a power conversion apparatus according to a seventh embodiment.

FIG. 16 is a diagram illustrating an example of a circuit configuration of a power conversion apparatus according to a seventh embodiment. In the seventh embodiment, a MOSFET is used as the power semiconductor element 32$a$. The power semiconductor element 32$a$ constitutes a two-level three-phase inverter circuit. The power semiconductor element 32$a$ and the diode 32$b$ are sealed with resin as an integral module for the purpose of ensuring insulation properties and a mechanical strength. The power semiconductor element 32$a$ and the diode 32$b$ constitute a three-phase power semiconductor module 34. The three-phase power semiconductor module 34 includes a module U-terminal 34UA, a module V-terminal 34VA, a module W-terminal 34WA, a module P-terminal 34PD, and a module N-terminal 34ND. The module U-terminal 34UA, the module V-terminal 34VA, and the module W-terminal 34WA, are connected through the wires to the electric motor 2 that is a load. The main capacitor 4 is connected to the module P-terminal 34PD and the module N-terminal 34ND.

The P-side U-phase of the power semiconductor module is described below. Within the three-phase power semiconductor module 34, a switching current flows through the internal wires (63CP and 62UP) that connect the module P-terminal 34PD and the power semiconductor element 32$a$. The switching-current shunt component 70$a$ is attached in parallel to these wires. The same applies to the N-side U-phase of the power semiconductor module. The switching-current shunt component 70$b$ is attached to the corresponding wires. Further, the switching-current shunt component 70$c$ is attached between the power semiconductor elements 32$a$. The identical configuration is also employed in the V-phase and the W-phase of the power semiconductor module. As described above, the feature of the seventh embodiment is that the switching-current shunt components 70 (70$a$, 70$b$, and 70$c$), and the power semiconductor element 32$a$ and the diode 32$b$ which constitute a two-level three-phase inverter circuit, are accommodated in the common casing as an integral module. Further, also in the present embodiment, within the three-phase power semiconductor module 34, the switching-current shunt components 70 are provided between two points having substantially the same potential in a state in which the power semiconductor elements are not performing any switching operation.

Upon a switching operation of the power semiconductor module 32$a$, a switching current flows through the wires described above. According to the law of electromagnetism, surge voltages are generated in these wires. In the configuration of the seventh embodiment, a portion of the switching current is shunted to, and flows through, at least one of the switching-current shunt components 70$a$, 70$b$, and 70$c$. This can reduce the surge voltage generated in each wire.

Also, in the power conversion apparatus according to the seventh embodiment, the switching-current shunt components 70 are provided inside the three-phase power semiconductor module 34 in advance. Therefore, in the process of manufacturing the power conversion apparatus, the work of attachment of the switching-current shunt components 70 is unnecessary. Accordingly, the power conversion apparatus can be manufactured in a shorter time.

Figure 17:
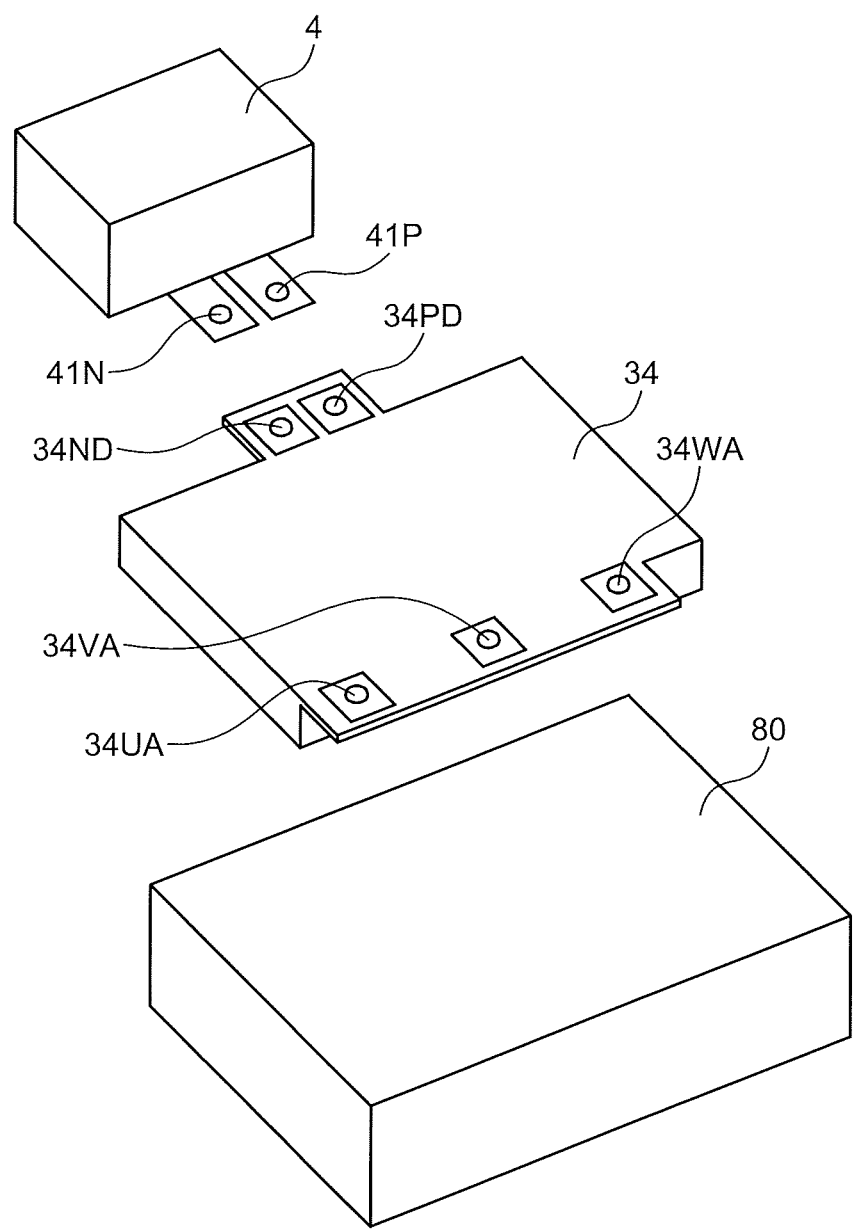
FIG. 17 is an exploded perspective view illustrating a configuration example of a part of components in the power conversion apparatus according to the seventh embodiment.
Figure 18:
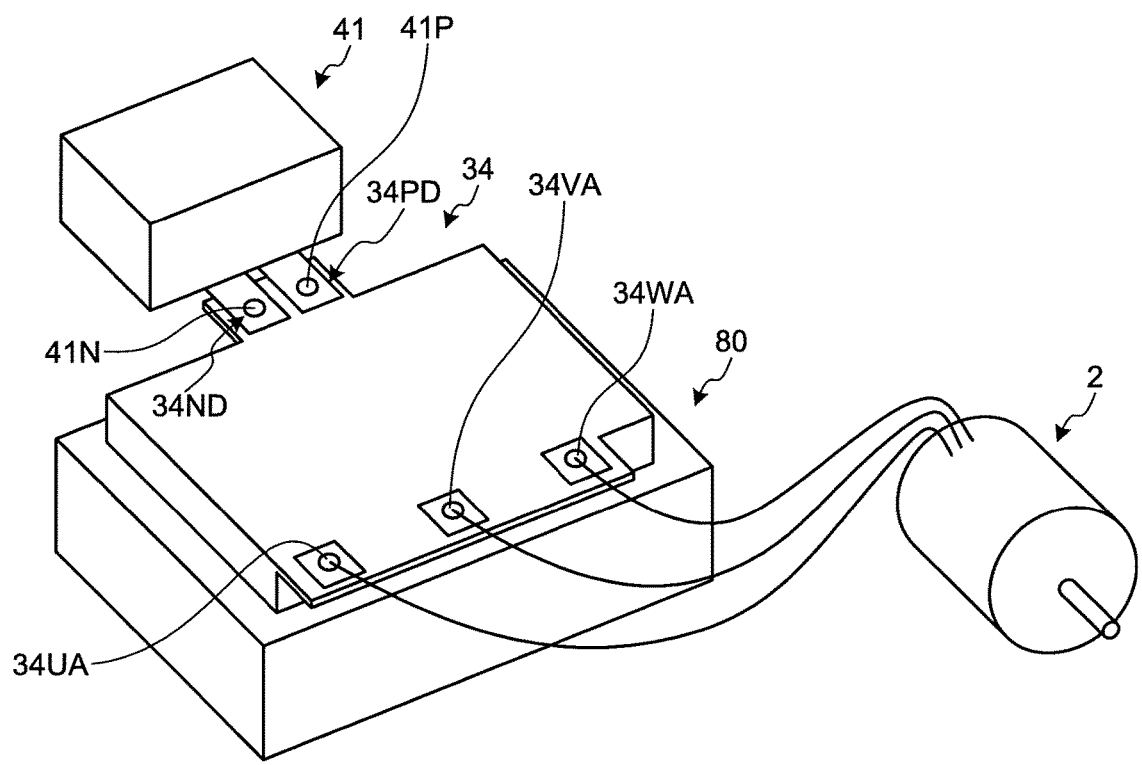
FIG. 18 is a perspective view illustrating an assembled state of the components illustrated in FIG. 17.

FIG. 17 is an exploded perspective view illustrating a configuration example of a part of the components in the power conversion apparatus according to the seventh embodiment. FIG. 18 is a perspective view illustrating an assembled state of the components illustrated in FIG. 17. As illustrated in FIGS. 17 and 18, the three-phase power semiconductor module 34 is installed on the cooler 80. The main capacitor 4 is installed in such a manner that the main-capacitor P-terminal 41P comes into contact with the module P-terminal 34PD of the three-phase power semiconductor module 34 to establish an electrical connection therebetween, and the main-capacitor N-terminal 41N comes into contact with the module N-terminal 34ND of the three-phase power semiconductor module 34 to establish an electrical connection therebetween. The module U-terminal 34UA, the module V-terminal 34VA, and the module W-terminal 34WA of the three-phase power semiconductor module 34, are connected through the wires to the electric motor 2 that is a load.

Figure 19:
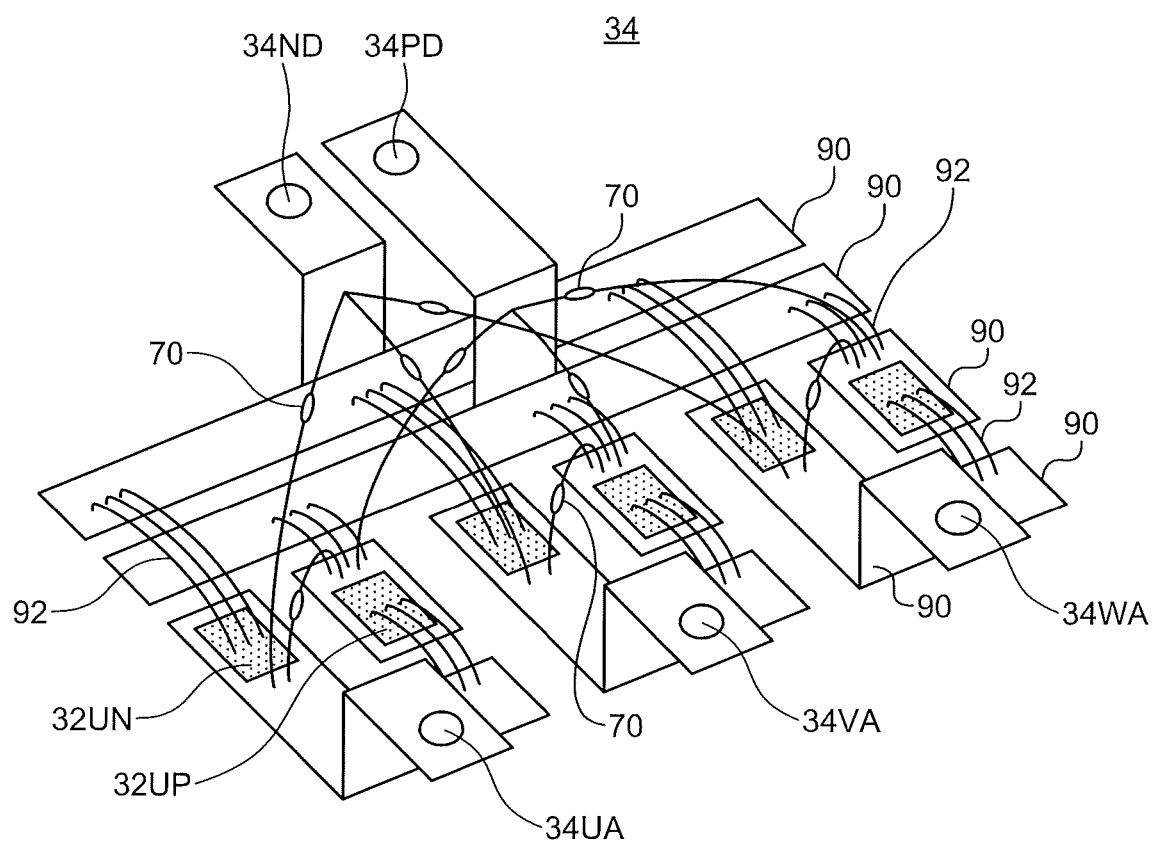
FIG. 19 is a perspective view illustrating an internal configuration example of a power semiconductor module according to the seventh embodiment.

FIG. 19 is a perspective view illustrating an internal configuration example of the three-phase power semiconductor module according to the seventh embodiment. FIG. 19 does not illustrate non-electric members such as resin. In FIG. 19, a P-side U-phase power semiconductor element 32UP is electrically connected to the module P-terminal 34PD through a connection member 90 and a wire 92, while an N-side U-phase power semiconductor element 32UN is electrically connected to the module N-terminal 34ND through a connection member 90 and a wire 92. Further, the P-side U-phase power semiconductor element 32UP, and the N-side U-phase power semiconductor element 32UN are electrically connected through a connection member 90 and a wire 92. A part of the connection member 90 serves as the module U-terminal 34UA. The V-phase and the W-phase of the power semiconductor module are configured in the same manner as the U-phase of the power semiconductor module. Therefore, the redundant descriptions thereof are omitted.

The wires through which a switching current flows are focused here. A wire exposed to the outside of the main capacitor 4 and the three-phase power semiconductor module 34 is shorter in comparison with a wire inside the three-phase power semiconductor module 34. In this case, it is possible to obtain a greater surge-voltage reduction effect when a switching-current shunt component is attached to the wire inside the three-phase power semiconductor module 34 than when a switching-current shunt component is attached to the wire exposed to the outside of the main capacitor 4 and the three-phase power semiconductor module 34.

The internal wires in the three-phase power semiconductor module 34 are not necessarily laid out by the shortest distance in the horizontal or vertical direction, and a parasitic inductance attributable to the wires within the module is not low. Therefore, a higher ringing voltage is generated in the wires inside the three-phase power semiconductor module 34.

In the configuration illustrated in FIG. 19, the switching-current shunt components 70 are attached in parallel to the wire 92 that connects the module P-terminal 34PD and the P-side U-phase power semiconductor element 32UP, to the wire 92 that connects the P-side U-phase power semiconductor element 32UP and the N-side U-phase power semiconductor element 32UN, and to the wire 92 that connects the N-side U-phase power semiconductor element 32UN and the module N-terminal 34ND. While a switching current flows through the wires inside the three-phase power semiconductor module 34, a portion of the switching current is shunted to the switching-current shunt components 70.

Therefore, surge voltages generated in the wires inside the three-phase power semiconductor module 34 can be reduced.

Also, the switching-current shunt components 70 are oriented in an oblique direction as illustrated in FIG. 19. The oblique orientation of the switching-current shunt components 70 provides their shorter distance than the wires inside the three-phase power semiconductor module 34, such that the resistance value that is proportional to the wire length can be reduced to thereby allow a larger switching current to be shunted to the switching-current shunt components 70. This results in a greater effect of reducing the surge voltage to be generated in the wires inside the three-phase power semiconductor module.

Figure 20:
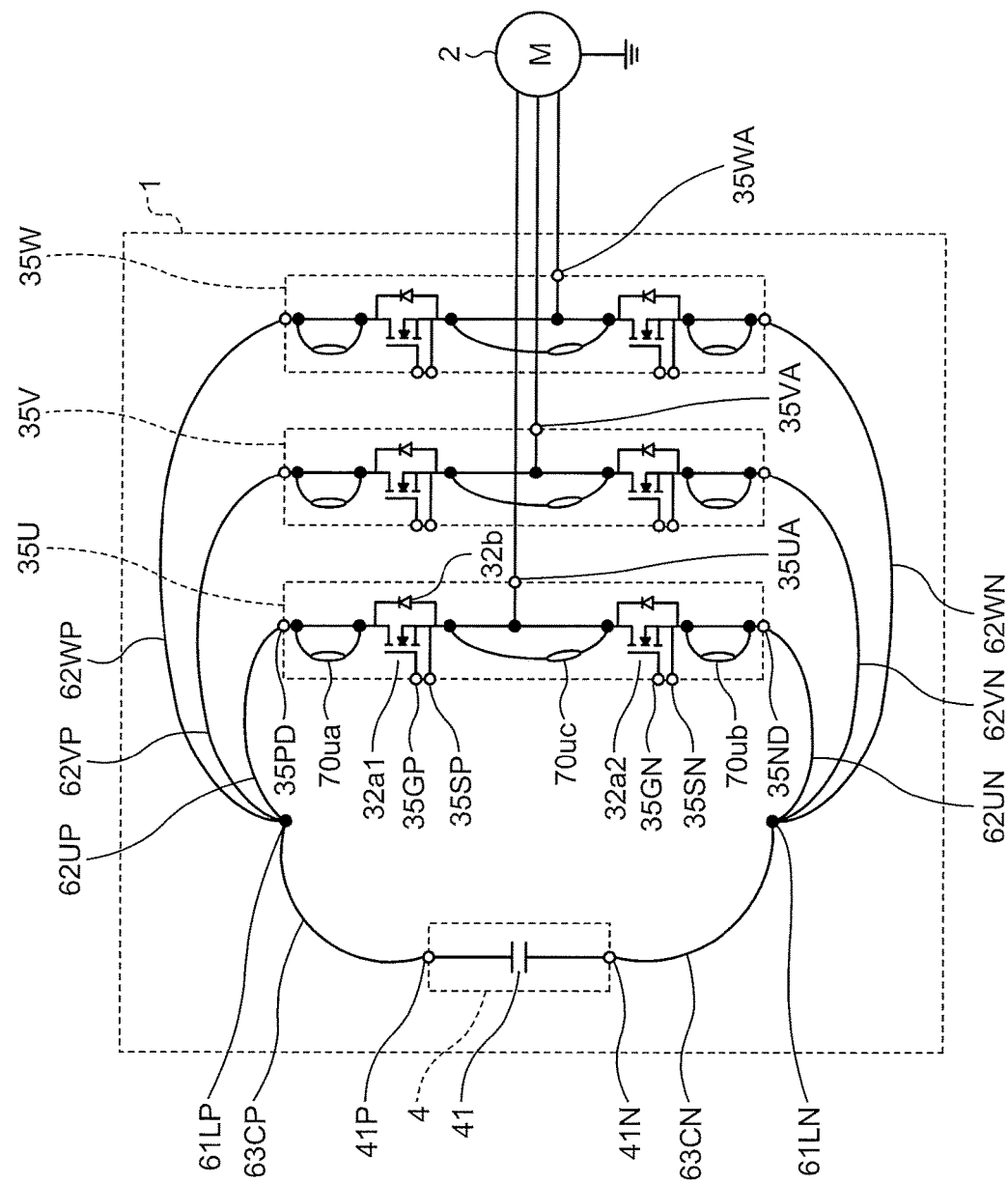
FIG. 20 is a diagram illustrating another example of the circuit configuration of the power conversion apparatus according to the seventh embodiment.

FIG. 20 is a diagram illustrating another example of the circuit configuration of the power conversion apparatus according to the seventh embodiment. In the configuration illustrated in FIG. 16, the six pairs of the power semiconductor element 32a and the diode 32b, all of which constitute the two-level three-phase inverter circuit, are integrated to constitute the three-phase power semiconductor module 34. In the configuration in FIG. 20, two pairs of a power semiconductor element 32a (32a1 or 32a2) and a diode 32b, which constitute an arm circuit for each phase, are integrated as a U-phase power semiconductor module 35U, a V-phase power semiconductor module 35V, or a W-phase power semiconductor module 35W. These U-phase, V-phase, and W-phase power semiconductor modules 35U, 35V, and 35W are used to constitute a two-level three-phase inverter circuit.

The configuration of the U-phase power semiconductor module is described below with reference to FIG. 20. First, a MOSFET is used as the power semiconductor element 32a that constitutes the U-phase power semiconductor module 35U. To electrically connect to an external circuit, the U-phase power semiconductor module 35U includes a P-terminal 35PD, an AC terminal 35UA, an N-terminal 35ND, a P-side gate control terminal 35GP, a P-side source control terminal 35SP, an N-side gate control terminal 35GN, and an N-side source control terminal 35SN. These terminals of the U-phase power semiconductor module 35U are electrically connected to the P-side U-phase power semiconductor element 32a1 and the N-side U-phase power semiconductor element 32a2 through the internal wires.

In the configuration in FIG. 20, three switching-current shunt components 70 are connected to the internal wires. More specifically, a switching-current shunt component 70ua is connected in parallel to the wire that connects the P-terminal 35PD and the P-side U-phase power semiconductor element 32a1. Further, a switching-current shunt component 70uc is connected in parallel to the wire that connects the P-side U-phase power semiconductor element 32a1 and the N-side U-phase power semiconductor element 32a2. Furthermore, a switching-current shunt component 70ub is connected in parallel to the wire that connects the N-terminal 35ND and the N-side U-phase power semiconductor element 32a2. In the manner as described above, the U-phase power semiconductor module 35U, and the switching-current shunt components 70ua, 70ub, and 70uc, are accommodated in the common casing as an integral module.

Upon switching operations of the P-side U-phase power semiconductor element 32a1 and the N-side U-phase power semiconductor element 32a2, a switching current flows through the wires described above. According to the law of electromagnetism, surge voltages are generated in these wires. In the configuration in FIG. 20, a portion of the switching current is shunted to, and flows through, at least one of the switching-current shunt components 70ua, 70ub, and 70uc. This can reduce the surge voltages generated in each wire.

Also, in the power conversion apparatus configured as illustrated in FIG. 20, the switching-current shunt components 70ua, 70ub, and 70uc are provided inside the U-phase power semiconductor module 35U in advance. Therefore, in the process of manufacturing the power conversion apparatus, the work of attachment of the switching-current shunt components 70ua, 70ub, and 70uc is unnecessary. Accordingly, the power conversion apparatus can be manufactured in a shorter time.

Eighth Embodiment

Figure 21:
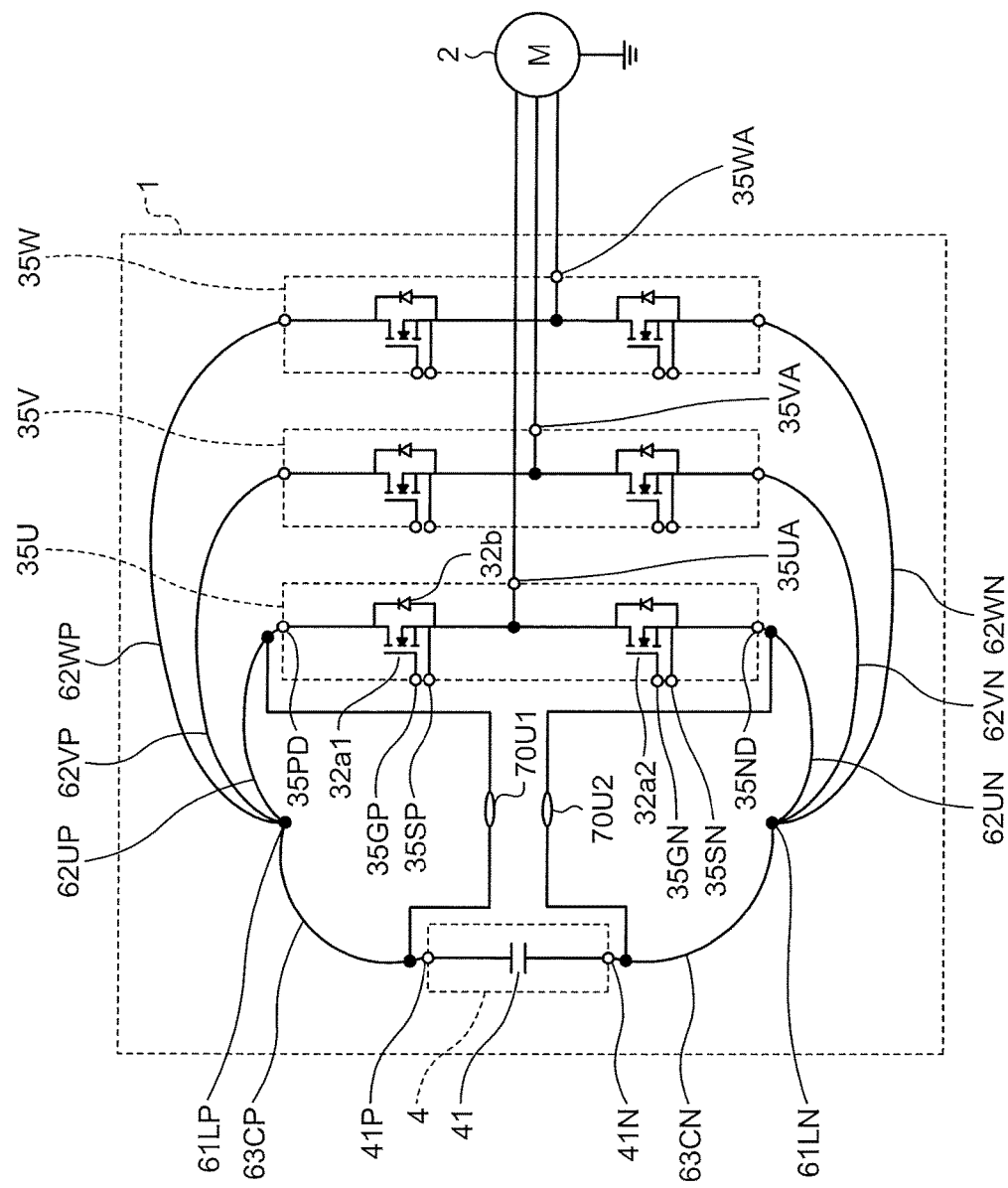
FIG. 21 is a diagram illustrating an example of a circuit configuration of a power conversion apparatus according to an eighth embodiment.

FIG. 21 is a diagram illustrating an example of a circuit configuration of a power conversion apparatus according to an eighth embodiment. In the eighth embodiment, two pairs of the power semiconductor element 32a (32a1 or 32a2) and the diode 32b, which constitute an arm circuit for each phase, are integrated as the U-phase power semiconductor module 35U, the V-phase power semiconductor module 35V, or the W-phase power semiconductor module 35W. These U-phase, V-phase, and W-phase power semiconductor modules 35U, 35V, and 35W are used to constitute the two-level three-phase inverter circuit. The U-phase power semiconductor module 35U, the V-phase power semiconductor module 35V, and the W-phase power semiconductor module 35W, are sealed with resin for the purpose of ensuring insulation properties and a mechanical strength.

The U-phase power semiconductor module is described below. To electrically connect to an external circuit, the U-phase power semiconductor module 35U includes the P-terminal 35PD, the AC terminal 35UA, the N-terminal 35ND, the P-side gate control terminal 35GP, the P-side source control terminal 35SP, the N-side gate control terminal 35GN, and the N-side source control terminal 35SN. These terminals of the U-phase power semiconductor module 35U are electrically connected to the P-side U-phase power semiconductor element 32a1 and the N-side U-phase power semiconductor element 32a2 through the internal wires. The identical configuration is also employed in the V-phase and W-phase power semiconductor modules. The connection of the U-phase power semiconductor module 35U to the main capacitor 4, the connection of the V-phase power semiconductor module 35V to the main capacitor 4, and the connection of the W-phase power semiconductor module 35W to the main capacitor 4, are the same as or equivalent to the respective connections in the first embodiment. The same or equivalent constituent elements are denoted by like reference signs and the redundant descriptions thereof are omitted.

A switching current, which is directed into the main capacitor 4 through the P-side common wire 63CP, passes through the main capacitor 4. A switching current that has passed through the main capacitor 4 flows through the N-side common wire 63CN in a direction out of the main capacitor 4. That is, a switching current that flows through the P-side common wire 63CP, and a switching current that flows through the N-side common wire 63CN are equal in magnitude, but are directed opposite each other.

A switching current, which is directed into the U-phase power semiconductor module 35U through the P-side U-phase wire 62UP, passes through the U-phase power semiconductor module 35U. Because a switching current does not flow through the electric motor 2, a switching current does not flow through the AC terminal 35UA of the U-phase power semiconductor module 35U. Therefore, a switching current that has passed through the U-phase power semiconductor module 35U flows through the N-side U-phase wire 62UN in a direction out of the U-phase power semiconductor module. That is, a switching current that flows through the P-side U-phase wire 62UP, and a switching current that flows through the N-side U-phase wire 62UN are equal in magnitude, but are directed opposite each other.

As illustrated in FIG. 21, a switching-current shunt component 70U1 is connected in parallel to the wire that connects the main-capacitor P-terminal 41P and the P-terminal 35PD of the U-phase power semiconductor module 35U. A switching current flows through the wire that connects the main-capacitor P-terminal 41P and the P-terminal 35PD of the U-phase power semiconductor module 35U, in the same direction as a switching current that is shunted to, and flows through, the switching-current shunt component 70U1.

Similarly, a switching-current shunt component 70U2 is connected in parallel to the wire that connects the main-capacitor N-terminal 41N and the N-terminal 35ND of the U-phase power semiconductor module 35U. A switching current flows through the wire that connects the main-capacitor N-terminal 41N and the N-terminal 35ND of the U-phase power semiconductor module 35U, in the same direction as a switching current that is shunted to, and flows through, the switching-current shunt component 70U2.

As described above, a switching current that flows through the wire that connects the main-capacitor P-terminal 41P and the P-terminal 35PD of the U-phase power semiconductor module 35U, is equal in magnitude to, but is directed opposite a switching current that flows through the wire that connects the main-capacitor N-terminal 41N and the N-terminal 35ND of the U-phase power semiconductor module 35U. Therefore, a switching current that flows through the switching-current shunt component 70U1, and a switching current that flows through the switching-current shunt component 70U2, are equal in magnitude, but are directed opposite each other.

In the configuration illustrated in FIG. 21, a parasitic inductance of the wire for attaching the switching-current shunt component 70U1, and a parasitic inductance of the wire for attaching the switching-current shunt component 70U2, cancel each other, thereby reducing the entire parasitic inductance. Because of the reduction in parasitic inductance, larger switching currents are shunted to the switching-current shunt components 70U1 and 70U2. This results in a greater effect of reducing the surge voltages generated in the wires.

Figure 22:
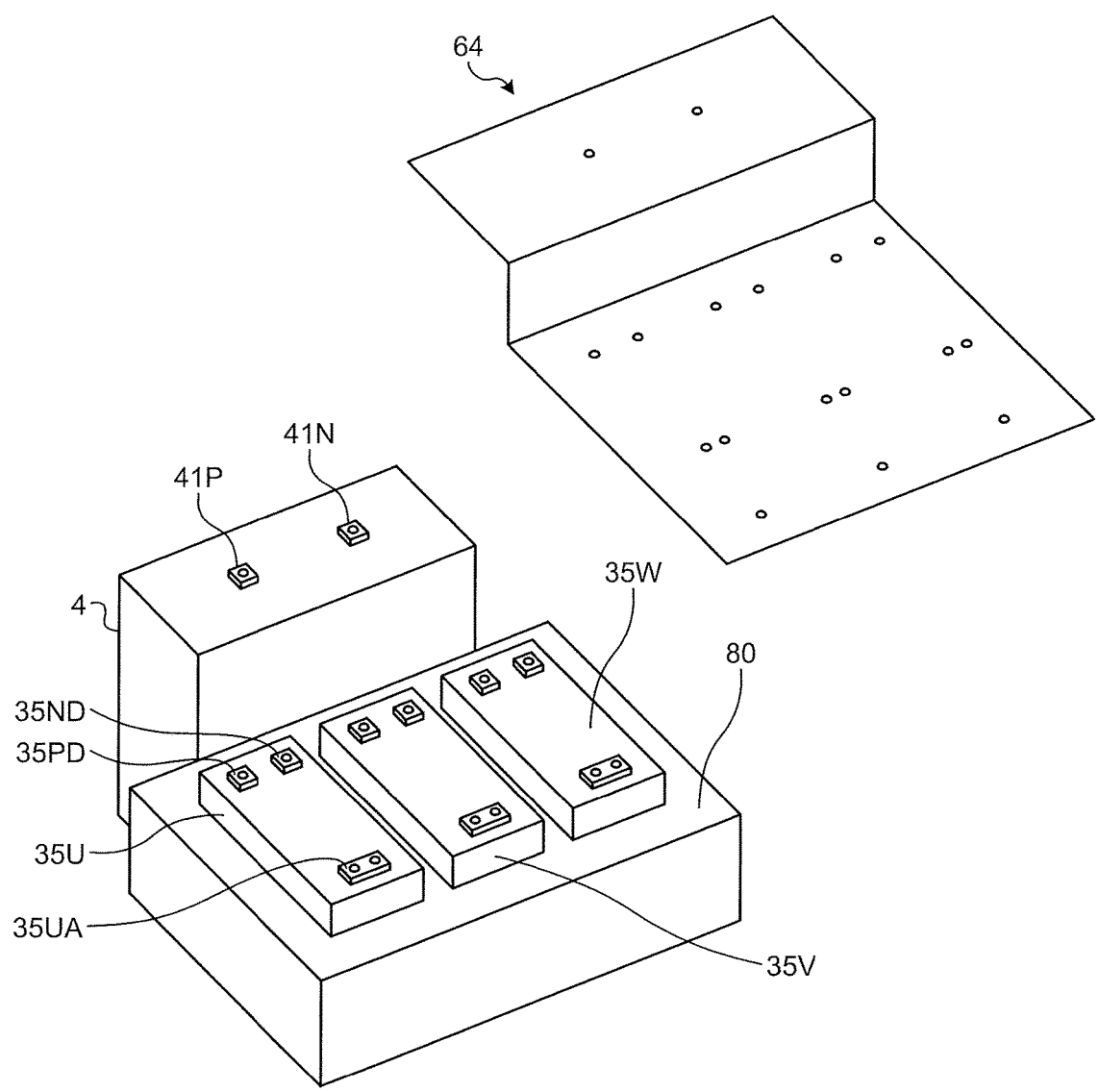
FIG. 22 is an exploded perspective view illustrating a configuration example of a part of components in the power conversion apparatus according to the eighth embodiment.
Figure 23:
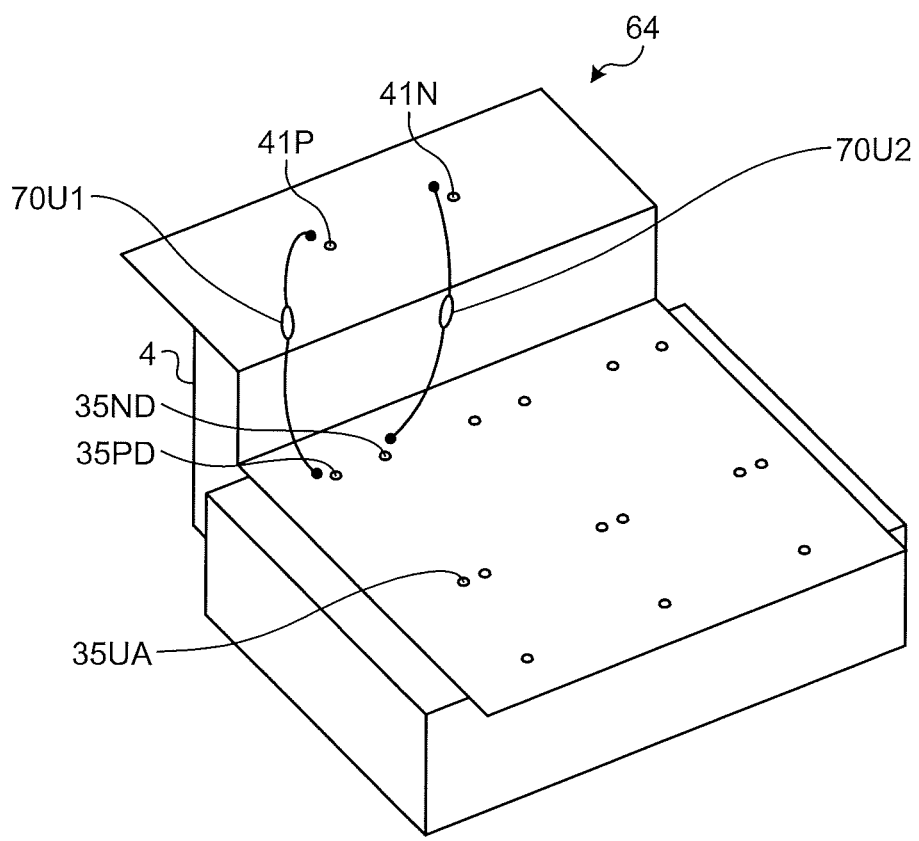
FIG. 23 is a perspective view illustrating a state in which switching-current shunt components according to the eighth embodiment are attached to an assembly of the components illustrated in FIG. 22.

FIG. 22 is an exploded perspective view illustrating a configuration example of a part of the components in the power conversion apparatus according to the eighth embodiment. FIG. 23 is a perspective view illustrating a state in which the switching-current shunt components according to the eighth embodiment are attached to an assembly of the components illustrated in FIG. 22. As illustrated in FIGS. 22 and 23, the U-phase power semiconductor module 35U, the V-phase power semiconductor module 35V, and the W-phase power semiconductor module 35W are installed on the cooler 80. The busbar 64 is installed in such a manner that an electrical connection is established between each terminal of the U-phase power semiconductor module 35U, the V-phase power semiconductor module 35V, and the W-phase power semiconductor module 35W, and the main-capacitor P-terminal 41P of the main capacitor 4, and between each terminal of the U-phase, V-phase, and W-phase power semiconductor modules 35U, 35V, and 35W, and the main-capacitor N-terminal 41N of the main capacitor 4. With the busbar 64 installed, one of the connection points of the switching-current shunt component 70U1, and one of the connection points of the switching-current shunt component 70U2, are connected directly to the P-terminal 35PD and the N-terminal 35ND of the U-phase power semiconductor module 35U, respectively, or are connected to the busbar 64 in the vicinities of these terminals. The other connection point of the switching-current shunt component 70U1, and the other connection point of the switching-current shunt component 70U2, are connected directly to the main-capacitor P-terminal 41P and the main-capacitor N-terminal 41N, respectively, or are connected to the busbar 64 in the vicinities of these terminals. Although not illustrated, it is to be understood that the V-phase and W-phase switching-current shunt components are connected in the same manner as the switching-current shunt components 70U1 and 70U2.

Two wires are selected as the wires for attaching the switching-current shunt components 70U1 and 70U2, respectively, such that switching currents that flow through the respective wires are equal in magnitude, but are directed opposite each other. However, two wires may be selected as the wires for attaching the switching-current shunt components 70U1 and 70U2, respectively, such that switching currents that flow through the respective wires are different in magnitude, and are directed opposite each other. In this case, a switching current that flows through the switching-current shunt component 70U1, and a switching current that flows through the switching-current shunt component 70U2, are different in magnitude, and are directed opposite each other. A portion of the parasitic inductance of the wire for attaching the switching-current shunt component 70U1, and a portion of the parasitic inductance of the wire for attaching the switching-current shunt component 70U2, cancel each other, thereby reducing part of the entire parasitic inductance. Because of the partial reduction in parasitic inductance, larger switching currents are shunted to the switching-current shunt components 70U1 and 70U2. The effect of reducing the surge voltage generated in the wires can be improved although this reduction effect is less as compared to the configuration illustrated in FIG. 21.

Figure 24:
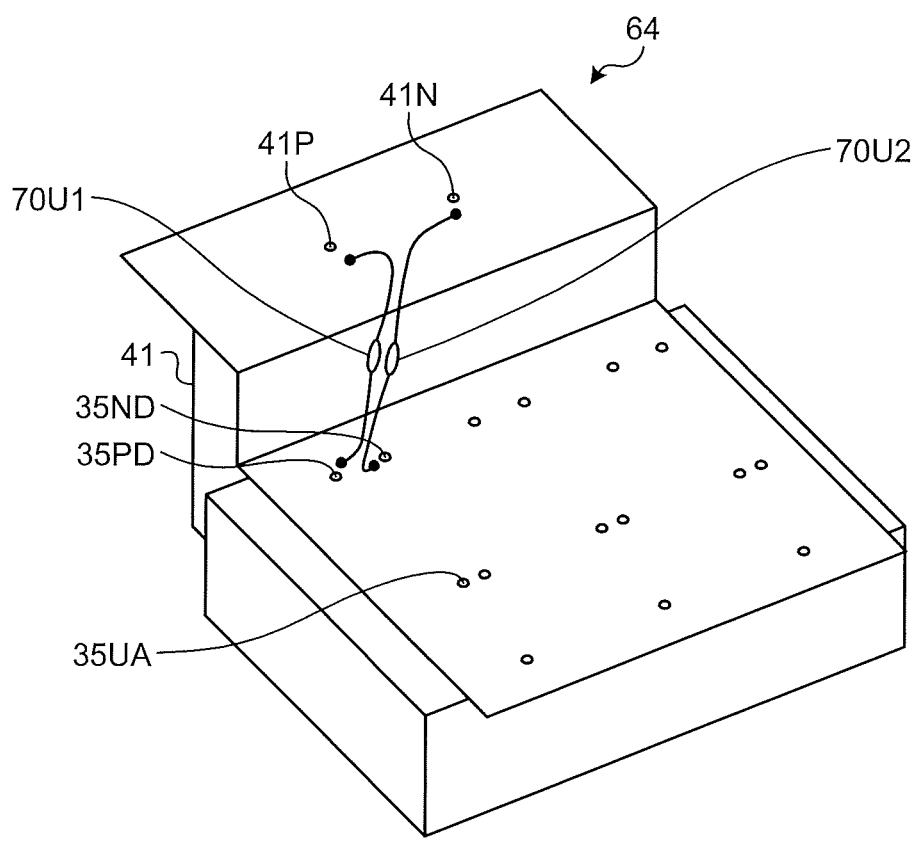
FIG. 24 is a perspective view illustrating another configuration example of the power conversion apparatus according to the eighth embodiment.

As illustrated in FIG. 24, it is desirable that the switching-current shunt components 70U1 and 70U2 are positioned close to each other. By the phrase "positioned close to each other" as used herein, it is meant that the distance between the switching-current shunt components 70U1 and 70U2 is equal to or less than the shorter one of: the distance between two connection points between the switching-current shunt component 70U1 and a wire through which a switching current flows (the wire that connects the main-capacitor P-terminal 41P and the P-terminal 35PD of the U-phase power semiconductor module 35U in the present embodiment); and the distance between two connection points between the switching-current shunt component 70U2 and a wire through which a switching current flows (the wire that connects the main-capacitor N-terminal 41N and the N-terminal 35ND of the U-phase power semiconductor module 35U in the present embodiment). The positioning of the switching-current shunt currents 70U1 and 70U2, which satisfies the condition as described above, corresponds to the phrase "positioned close to each other".

In the configuration illustrated in FIG. 24, a parasitic inductance of the wire for attaching the switching-current shunt component 70U1, and a parasitic inductance of the wire for attaching the switching-current shunt component 70U2, cancel each other more significantly, such that larger switching currents are shunted to the switching-current shunt components 70U1 and 70U2. This function can improve the effect of reducing the surge voltage generated in the wires.

Ninth Embodiment

The first to eighth embodiments have been described as applying the present invention to a two-level three-phase inverter circuit that is a power conversion circuit. However, the present invention can be also applied to a converter circuit that converts an alternating current to a direct current, in addition to an inverter circuit that converts a direct current to an alternating current. The present invention can be also applied to a single-phase inverter circuit and a single-phase converter circuit, that is, a two-level power conversion circuit. The present invention is not limited to being applied to a two-level power conversion circuit, but can also be applied to a multilevel power conversion circuit such as a three-level inverter circuit and a three-level converter circuit. A ninth embodiment of the present invention is discussed as applying the present invention to a single-phase three-level converter circuit.

Figure 25:
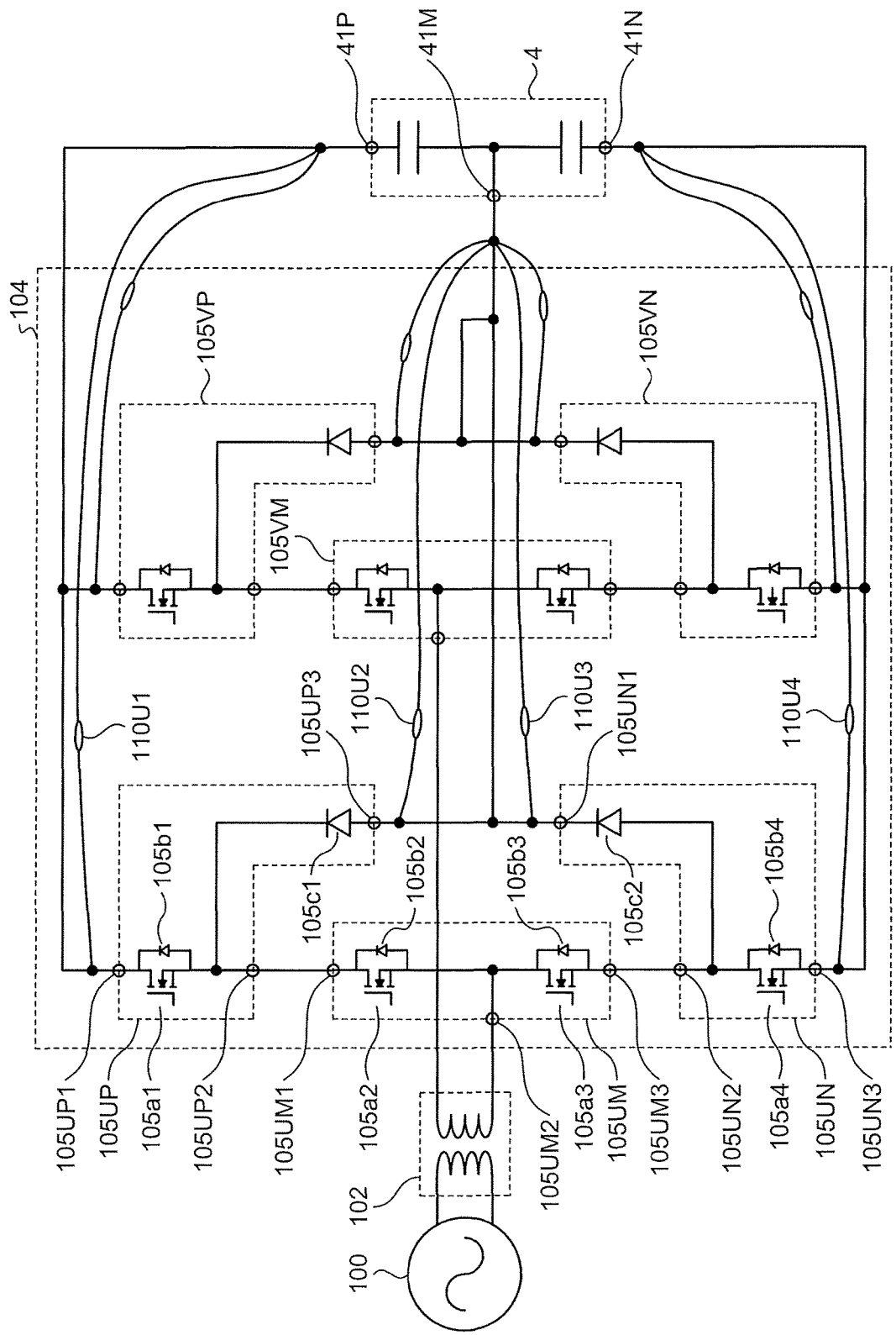
FIG. 25 is a diagram illustrating an example of a circuit configuration of a power conversion apparatus according to a ninth embodiment.

FIG. 25 is a circuit diagram of a power conversion apparatus according to the ninth embodiment. FIG. 25 illustrates a three-level AC-DC converter circuit. An AC electric power system 100 is connected to the input of a three-level converter circuit 104 through an insulating transformer 102. The three-level converter circuit 104, which outputs three types of DC voltages, includes three types of terminals that are positive-side terminals, intermediate terminals, and negative-side terminals. The main capacitor 4 includes three types of terminals that are a positive-side terminal 41P, an intermediate terminal 41M, and a negative-side terminal 41N. The positive-side terminals of the converter circuit 104 are connected to the positive-side terminal 41P of the main capacitor 4. The negative-side terminals of the converter circuit 104 are connected to the negative-side terminal 41N of the main capacitor 4. The intermediate terminals of the converter circuit 104 are connected to the intermediate terminal 41M of the main capacitor 4.

In the present embodiment, each phase of the three-level converter circuit is constituted by an upper module 105UP, an intermediate module 105UM, and a lower module 105UN, and is constituted by an upper module 105VP, an intermediate module 105VM, and a lower module 105VN. The individual terminals of the upper modules 105UP and 105VP, and the lower modules 105UN and 105VN constitute the positive-side terminals, the intermediate terminals, and the negative-side terminals of the converter circuit 104.

The U-phase configuration is described below. First, in the upper module 105UP, a switching element 105*a*1 and a freewheeling diode element 105*b*1 that is connected in inverse parallel to the switching element 105*a*1 are provided between a first terminal 105UP1 and a second terminal 105UP2. Also, a diode element 105*c*1 is provided between the second terminal 105UP2 and a third terminal 105UP3. The upper module 105UP is herein referred to as "chopper module". In the present embodiment, a MOSFET is used as the switching element 105*a*1. In this case, a parasitic diode incorporated in the MOSFET may be used as the freewheeling diode element 105*b*1, or aside from the MOSFET, a Schottky barrier diode or a P-N junction diode may be used as the freewheeling diode element 105*b*1. The same applies to the intermediate module 105UM and the lower module 105UN.

In the intermediate module 105UM, a switching element 105*a*2 and a freewheeling diode element 105*b*2 that is connected in inverse parallel to the switching element 105*a*2 are provided between a first terminal 105UM1 and a second terminal 105UM2. Also, a switching element 105*a*3 and a freewheeling diode element 105*b*3 that is connected in inverse parallel to the switching element 105*a*3 are provided between the second terminal 105UM2 and a third terminal 105UM3. The intermediate module 105UM is herein referred to as "two-in-one module".

The lower module 105UN is constituted by a chopper module similarly to the upper module 105UP. A diode element 105*c*2 is provided between a first terminal 105UN1 and a second terminal 105UN2. A switching element 105*a*4 and a freewheeling diode element 105*b*4 that is connected in inverse parallel to the switching element 105*a*4 are provided between the second terminal 105UN2 and a third terminal 105UN3.

Each of the upper module 105UP and the lower module 105UN may be constituted by a two-in-one module similarly to the intermediate module 105UM, that is, all of the modules having the same configuration may be used. The four switching elements and two freewheeling diode elements, all of which constitute a single phase of the three-level converter circuit 104, may be constituted by modules (so-called one-in-one modules) each of which has a single element installed thereon. The module configuration is not limited to the configuration in FIG. 25.

The feature of the three-level converter circuit 104 illustrated in FIG. 25 is that switching-current shunt components 110U1 to 110U4 are connected in parallel to the corresponding wires that connect the upper module 105UP, the intermediate module 105UM, and the lower module 105UN to the main capacitor 4, in the same manner as the other embodiments.

As illustrated in FIG. 25, the switching-current shunt component 110U1 is provided so as to be connected in parallel to the wire that connects the first terminal 105UP1 (the positive-side terminal of the three-level converter circuit 104) of the upper module 105UP to the positive-side terminal 41P of the main capacitor 4. Also, the switching-current shunt component 110U4 is provided so as to be connected in parallel to the wire that connects the third terminal 105UN3 (the negative-side terminal of the three-level converter circuit 104) of the lower module 105UN to the negative-side terminal 41N of the main capacitor 4. Further, the switching-current shunt component 110U2 is provided so as to be connected in parallel to the wire that connects the third terminal 105UP3 (the intermediate terminal of the three-level converter circuit 104) of the upper module 105UP to the intermediate terminal 41M of the main capacitor 4. Furthermore, the switching-current shunt component 110U3 is provided so as to be connected in parallel to the wire that connects the first terminal 105UN1 (the intermediate terminal of the three-level converter circuit 104) of the lower module 105UN to the intermediate terminal 41M of the main capacitor 4. As described above, the ninth embodiment also has the features that the switching-current shunt components 110U2 and 110U3 are provided so as to be connected in parallel, respectively, to an intermediate-point connection wire member that is the wire that connects the third terminal 105UP3 of the upper module 105UP to the intermediate terminal 41M of the main capacitor 4, and to an intermediate-point connection wire member that is the wire that connects the first terminal 105UN3 of the lower module 105UN to the intermediate terminal 41M of the main capacitor 4. The intermediate-point connection wire members include the wire that connects the upper module 105UP and the lower module 105UN, and the wire that connects the upper module 105VP and the lower module 105VN, as well as the wire that connects the connection point between the upper module 105UP and the lower module 105UN to the intermediate terminal of the main capacitor 4, and the wire that connects the connection point between the upper module 105VP and the lower module 105VN to the intermediate terminal of the main capacitor 4. In addition to the configuration of the present embodiment, the switching-current shunt components 70 may also be provided to the intermediate-point connection wire member that connects the upper module 105UP and the lower module 105UN, and to the intermediate-point connection wire member that connects the upper module 105VP and the lower module 105VN.

Upon a switching operation of the power semiconductor element, a switching current flows through the wire which connects each module and the main capacitor 4, and therefore a surge voltage is generated. In the configuration in FIG. 25, a portion of the switching current is shunted to, and flows through, the switching-current shunt components 110U1, 110U2, 110U3, and 110U4. This can reduce the surge voltage.

Also in the present embodiment, the switching-current shunt components 110U1, 110U2, 110U3, and 110U4 are connected in parallel to the corresponding wires at two points having substantially the same potential. Therefore, the switching-current shunt components 110U1, 110U2, 110U3, and 110U4 can be constituted by low voltage-resistant components. This can suppress an increase in size of the power conversion apparatus.

Figure 26:
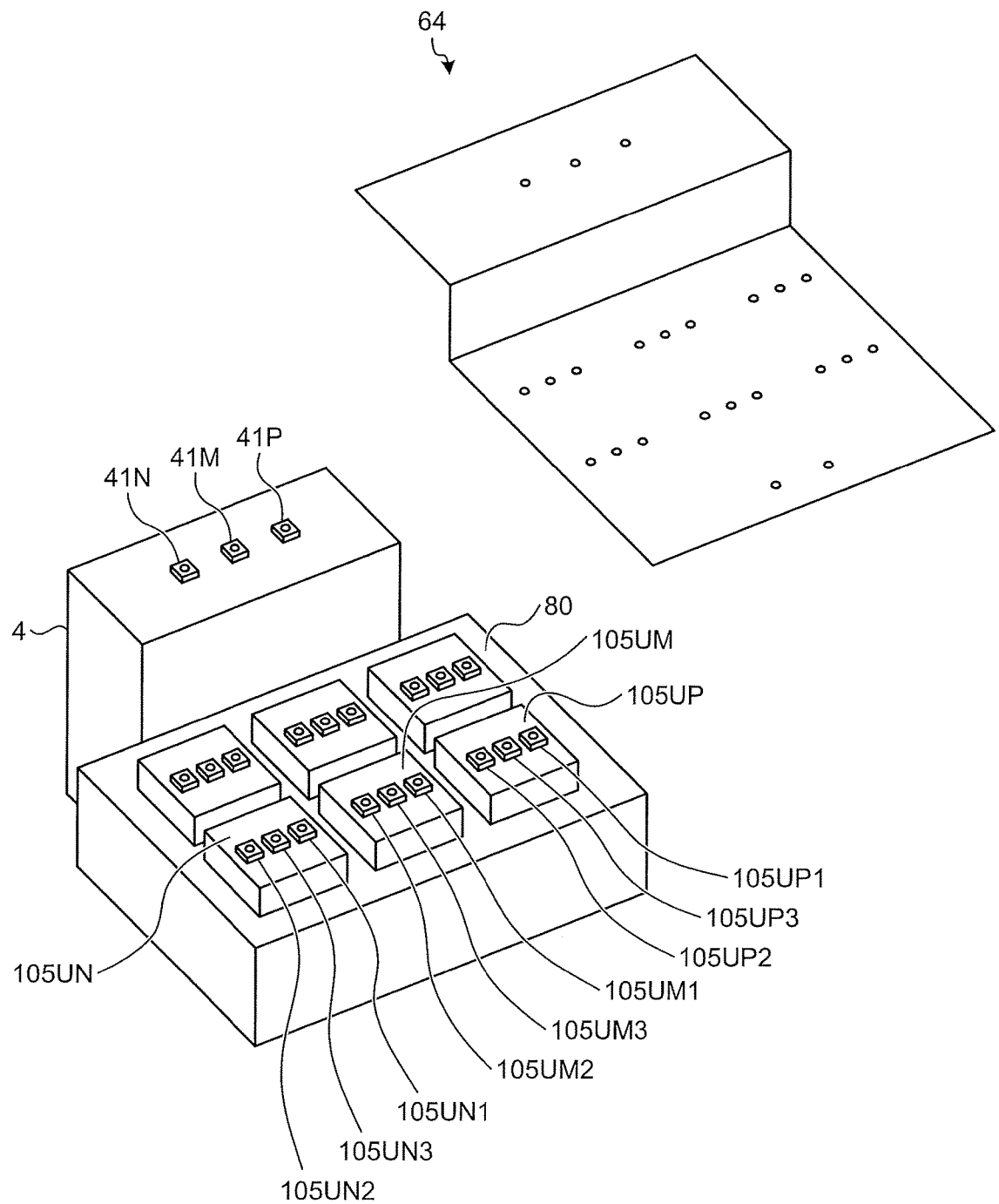
FIG. 26 is an exploded perspective view illustrating a configuration example of a part of components in the power conversion apparatus according to the ninth embodiment.

FIG. 26 is an exploded perspective view illustrating a configuration example of a part of the components in the power conversion apparatus according to the ninth embodiment. The upper module 105UP, the intermediate module 105UM, and the lower module 105UN are fixed on their bottom surface to the cooler 80. The first terminal 105UP1, the second terminal 105UP2, and the third terminal 105UP3 of the upper module 105UP, the first terminal 105UM1, the second terminal 105UM2, and the third terminal 105UM3 of the intermediate module 105UM, and the first terminal 105UN1, the second terminal 105UN2, and the third terminal 105UN3 of the lower module 105UN are individually configured as a screw terminal to electrically connect a switching element and a diode element within the module to the main capacitor 4 and an external circuit (not illustrated). The positive-side terminal 41P, the intermediate terminal 41M, and the negative-side terminal 41N of the main capacitor 4 are also configured individually as a screw terminal to electrically connect the upper module 105UP, the intermediate module 105UM, and the lower module 105UN to an external circuit (not illustrated).

Also in the present embodiment, the wire that connects the first terminal 105UP1 of the upper module 105UP to the positive-side terminal 41P of the main capacitor 4, the wire that connects the third terminal 105UN3 of the lower module 105UN to the negative-side terminal 41N of the main capacitor 4, the wire that connects the third terminal 105UP3 of the upper module 105UP to the intermediate terminal 41M of the main capacitor 4, and the wire that connects the first terminal 105UN1 of the lower module 105UN to the intermediate terminal 41M of the main capacitor 4, are constituted by a single busbar 64. The upper module 105UP, the intermediate module 105UM, and the lower module 105UN are electrically connected to the main capacitor 4 by the busbar 64.

Figure 27:
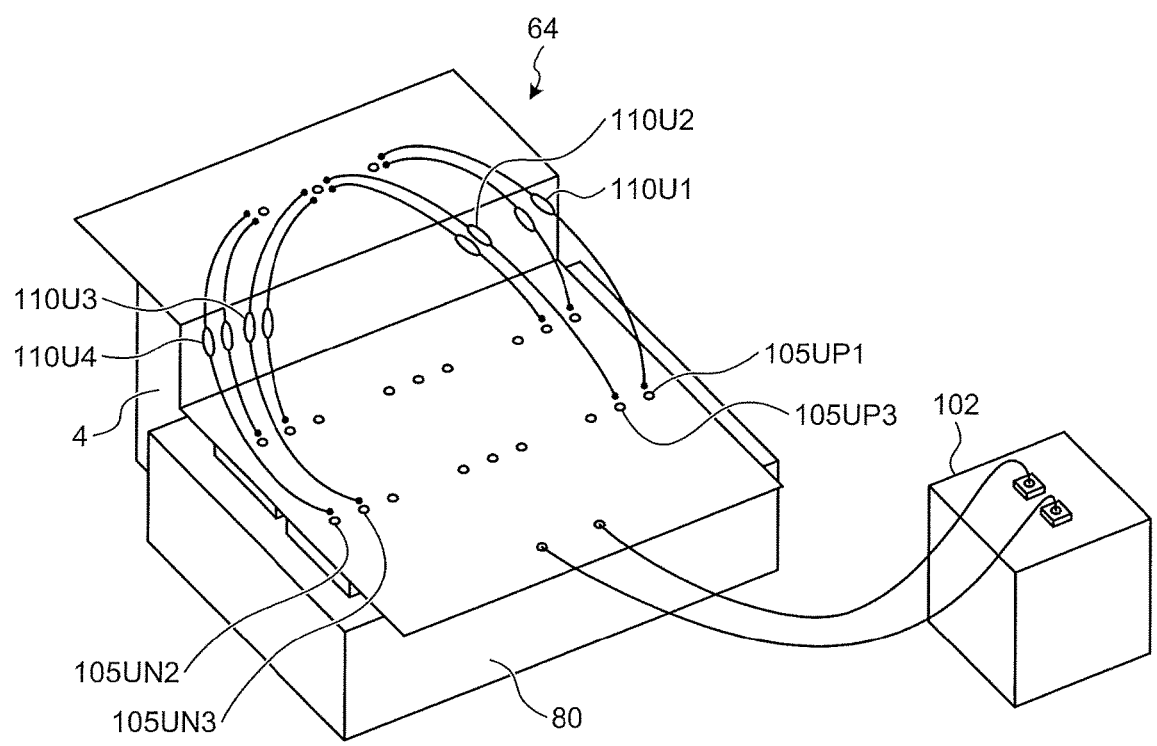
FIG. 27 is a perspective view illustrating a state in which switching-current shunt components according to the ninth embodiment are attached to an assembly of the components illustrated in FIG. 26.

FIG. 27 is a perspective view illustrating a state in which the switching-current shunt components according to the ninth embodiment are attached an assembly of the components illustrated in FIG. 26. Also in the present embodiment, the switching-current shunt components 110U1 to 110U4 are connected between the main capacitor 4 and the upper, intermediate, and lower modules 105UP, 105UM, and 105UN, by using the busbar 64. Each of the switching-current shunt components 110U1 to 110U4 and the screw terminal may be fastened and connected together. In either case, the switching-current shunt components 110U1 to 110U4 are connected in parallel to the corresponding wires, each of which connects each module and the main capacitor 4. Therefore, a portion of the switching current is shunted to, and flows through, the switching-current shunt components 110U1 to 110U4.

While only the U-phase configuration has been described in the above explanations, the V-phase can also have the same configuration, and use the same wiring layout as the U-phase configuration. In the case where the three-level converter circuit 104 is a three-phase circuit, the W-phase can also have the same configuration, and use the same wiring layout as the U-phase and V-phase configurations.

Lastly, materials of the power semiconductor element used in the aforementioned power conversion apparatus are described. It is common to use silicon (Si) as materials of the power semiconductor element. The techniques described in the above first to eighth embodiments can be configured by using this common Si element.

Meanwhile, the techniques described in the above first to ninth embodiments are not limited to being configured by using the Si element. These techniques can also be configured by using a power semiconductor element of silicon carbide (SiC) materials that have received attention in recent years, in place of the Si element.

The SiC element has superior characteristics. For example, the SiC element has a greater heat transfer coefficient, is operable at a higher temperature, and enables higher-speed switching, as compared to the Si element. By using the SiC element as one or both of a transistor element and a diode element in the power conversion apparatus 1, the apparatus 1 can benefit from the usage of the SiC element. That is, Since the SiC element has a greater heat transfer coefficient and is operable at a higher temperature, this makes it possible to downsize the cooling mechanism, thereby further downsizing the module. Since the SiC element enables the higher-speed switching, the switching loss is suppressed, which makes it possible to downsize the cooling mechanism and thus further downsize the module.

SiC is an example of a semiconductor referred to as "wide bandgap semiconductor" because of its wider bandgap properties than Si (in contrast thereto, Si is referred to as "narrow bandgap semiconductor"). In addition to SiC, a semiconductor formed of a gallium nitride-based material or diamond, for example, also belongs to the wide bandgap semiconductor. Their properties are similar to those of SiC in many respects. Therefore, a configuration using the wide bandgap semiconductor other than SiC also constitutes the substance of the present invention.

As described above, the SiC element seems like an ideal material. However, the SiC element is capable of higher-speed switching, which results in a greater time rate of change of the switching current that flows through the wires inside the power conversion apparatus. Therefore, a higher surge voltage is generated in the wires, and a higher surge voltage is applied to a component inside the power conversion apparatus. Meanwhile, when any of the techniques according to the first to eighth embodiments described above is applied, a portion of the switching current is shunted to, and flows through, the switching-current shunt component 70. This reduces the switching current that flows through the wires, and therefore can reduce the surge voltage generated in the wires. Accordingly, the surge voltage applied to a component inside the power conversion apparatus can be reduced. In addition, a DC voltage is not applied to the switching-current shunt component 70 for a long time. Consequently, the effect that the switching-current shunt component 70 can be constituted by only low voltage-resistant components can be obtained. The techniques according to the first to ninth embodiments are thus useful particularly for a power conversion apparatus that uses the SiC element.

The configurations described in the first to ninth embodiments described above are only examples of the configurations of the present invention. It is needless to mention that these configurations can be combined with other well-known techniques, and the configurations can be modified without departing from the scope of the present invention, such as omitting a part the configurations.

REFERENCE SIGNS LIST 1 power conversion apparatus
2 electric motor
3 inverter circuit (power conversion circuit)
4 main capacitor
31 power semiconductor module
31UP P-side U-phase power semiconductor module
31VP P-side V-phase power semiconductor module
31WP P-side W-phase power semiconductor module
31UN N-side U-phase power semiconductor module
31VN N-side V-phase power semiconductor module
31WN N-side W-phase power semiconductor module
32a power semiconductor element
32b diode
32UP P-side U-phase power semiconductor element
32UN N-side U-phase power semiconductor element
32a1 P-side U-phase power semiconductor element
32a2 N-side U-phase power semiconductor element
34 three-phase power semiconductor module
34UA module U-terminal
34VA module V-terminal
34WA module W-terminal
34PD module P-terminal
34ND module N-terminal
35U U-phase power semiconductor module
35V V-phase power semiconductor module
35W W-phase power semiconductor module
35GP P-side gate control terminal
35GN N-side gate control terminal
35SP P-side source control terminal
35SN N-side source control terminal
35PD P-terminal
35UA AC terminal
35ND N-terminal
41 capacitor element
41P main-capacitor P-terminal (positive-side terminal)
41M intermediate terminal
41N main-capacitor N-terminal (negative-side terminal)
61LP P-side wire relay point
61LN N-side wire relay point
62UP P-side U-phase wire
62VP P-side V-phase wire
62WP P-side W-phase wire
62UN N-side U-phase wire
62VN N-side V-phase wire
62WN N-side W-phase wire
63CP P-side common wire
63CN N-side common wire
63CP1, 63CP2, 63CP3 wire parasitic inductance
64 busbar
64a bent section
64b, 64c flat section
70, 70a, 70b, 70c, 70a1, 70a2, 70b, 70b1, 70b2, 70b3, 70c, 70c1, 70c2, 70ua, 70ub, 70uc, 70U1, 70U2 switching-current shunt component
71 diode
72a inductor
72b capacitor
80 cooler
90 connection member
92 wire
C, C1, C2 collector terminal
CA1 collector auxiliary terminal
D1 drain terminal
E, E1, E2 emitter terminal
EC emitter control terminal
GC gate control terminal
SC source control terminal
100 AC electric power system
102 insulating transformer
104 three-level converter circuit
105a1 switching element
105a2 switching element
105a3 switching element
105a4 switching element
105c1 diode element
105c2 diode element
105b1 freewheeling diode element
105b2 freewheeling diode element
105b3 freewheeling diode element
105b4 freewheeling diode element
105UN, 105VN lower module
105UP, 105VP upper module
105UP1 first terminal of upper module 105UP
105UP2 second terminal of upper module 105UP
105UP3 third terminal of upper module 105UP
105UM1 first terminal of intermediate module 105UM
105UM2 second terminal of intermediate module 105UM
105UM3 third terminal of intermediate module 105UM
105UN1 first terminal of lower module 105UN
105UN2 second terminal of lower module 105UN
105UN3 third terminal of lower module
110U1, 110U2, 110U3, 110U4 switching-current shunt component

The invention claimed is:

1. A power conversion apparatus comprising:
a power conversion circuit that is constituted by a semiconductor module including a power semiconductor element to perform a switching operation, the power conversion circuit including a positive-side terminal and a negative-side terminal;
a capacitor that includes a positive-side terminal and a negative-side terminal;
a wire member that includes a positive-side connection wire member connecting the positive-side terminal of the power conversion circuit to the positive-side terminal of the capacitor, and a negative-side connection wire member connecting the negative-side terminal of the power conversion circuit to the negative-side terminal of the capacitor; and a switching-current shunt component that is connected in parallel to at least one of the positive-side connection wire member and the negative-side connection wire member of the wire member, a portion of a switching current being shunted to the switching-current shunt component, and the switching-current shunt component is a two-terminal component, and when the switching-current shunt component is connected in parallel to the positive-side connection wire member, there are two connection points between the switching-current shunt component and the positive-side connection wire member, and when the switching-current shunt component is connected in parallel to the negative-side connection wire member, there are two connection points between the switching-current shunt component and the negative-side connection wire member.

2. The power conversion apparatus according to claim 1, wherein
the wire member is constituted by a busbar,
the busbar is connected to the positive-side terminal and the negative-side terminal of the power conversion circuit, and to the positive-side terminal and the negative-side terminal of the capacitor, and
the switching-current shunt component is connected to the busbar.

3. The power conversion apparatus according to claim 1, wherein the power conversion apparatus converts DC power to AC power, or converts AC power to DC power, and wherein
the power semiconductor element includes a positive-side switching element, and a negative-side switching element connected in series to the positive-side switching element,
the power conversion apparatus further comprises an AC-side connection wire member to connect the positive-side switching element and the negative-side switching element, and
the switching-current shunt component is also connected in parallel to the AC-side connection wire member.

4. The power conversion apparatus according to claim 1, wherein
the power conversion circuit is a three-level power conversion circuit including the positive-side terminal, the negative-side terminal, and a first intermediate terminal,
the capacitor includes a second intermediate terminal,
the power conversion apparatus comprises an intermediate-point connection wire member to connect the first intermediate terminal of the power conversion circuit to the second intermediate terminal of the capacitor, and
the switching-current shunt component is also connected in parallel to the intermediate-point connection wire member.

5. The power conversion apparatus according to claim 1, wherein
a first switching-current shunt component through which a first switching current flows, and a second switching-current shunt component through which a second switching current flows, are provided as the switching-current shunt component, and
a direction of flow of the first switching current that flows through the first switching-current shunt component, and a direction of flow of the second switching current that flows through the second switching-current shunt component, are opposite to each other.

* * * * *